(12) United States Patent
Aoki et al.

(10) Patent No.: US 6,196,577 B1
(45) Date of Patent: Mar. 6, 2001

(54) AIR BAG APPARATUS

(75) Inventors: Takashi Aoki; Takashi Honda; Kazuhiro Seki; Yuichi Saito, all of Saitama (JP)

(73) Assignee: Honda Giken Kogyo Kabushiki Kaisha, Toyko (JP)

( * ) Notice: Subject to any disclaimer, the term of this patent is extended or adjusted under 35 U.S.C. 154(b) by 0 days.

(21) Appl. No.: 09/397,010

(22) Filed: Sep. 15, 1999

(30) Foreign Application Priority Data

Sep. 18, 1998 (JP) .................................................. 10-264082
Sep. 18, 1998 (JP) .................................................. 10-265308

(51) Int. Cl.[7] .................................................. B60R 21/22
(52) U.S. Cl. .................................................. 280/730.1
(58) Field of Search ........................... 280/730.2, 730.1, 280/743.1

(56) References Cited

U.S. PATENT DOCUMENTS

| | | | |
|---|---|---|---|
| 5,709,402 | * | 1/1998 | Leonard .............................. 280/728.2 |
| 5,727,812 | * | 3/1998 | Dykstra et al. ....................... 280/731 |
| 5,848,804 | * | 12/1998 | White, Jr. et al. ................. 280/743.1 |
| 5,857,696 | * | 1/1999 | Inoue et al. ........................ 280/728.2 |
| 5,863,062 | * | 1/1999 | Harada et al. ..................... 280/728.3 |
| 5,931,491 | * | 8/1999 | Bosgeiter et al. ................. 280/728.2 |
| 5,992,882 | * | 11/1999 | Ito et al. ............................ 280/743.1 |

FOREIGN PATENT DOCUMENTS

180623 * 8/1970 (DE) ..................................... 280/130

* cited by examiner

Primary Examiner—Brian L. Johnson
Assistant Examiner—Tony Winner
(74) Attorney, Agent, or Firm—Armstrong, Westerman, Hattori, McLeland & Naughton

(57) ABSTRACT

A side impact air bag apparatus located in a seat back of a vehicle for directly initiating an air bag longitudinally before completely inflating the bag in the width direction. The side impact air bag has a casing with an interior, a support for an inflator and a bag enclosing the inflator. The bag is capable of direct inflation longitudinally before completely inflating in the width direction. The bag is arranged inside the casing to have, a forward middle portion associated with the inflator, a right base cloth portion extending from the right of the forward middle portion and having first angled bellow folds of cloth, a left base cloth portion extending from the left of the forward middle portion and having second angled bellow folds of cloth, and an interior gas flow passage extending between the forward middle portion and the inflator, such that gas generated by the inflator easily reaches the forward middle portion through the interior gas flow passage and pushes the forward middle portion out in a longitudinal direction before the first bellow folds and the second bellow folds are inflated.

16 Claims, 20 Drawing Sheets

AIR BAG APPARATUS

BACKGROUND OF THE INVENTION

The present invention relates to an air bag apparatus in which an air bag, disposed in the inside of a seat back is inflated in a cabin upon a vehicle side collision thereby protecting a side portion of an occupant.

An air bag apparatus for protecting a side portion of an occupant in a car is disclosed, for example, in Japanese Patent Unexamined Publication No. Hei. 10-53086 or in Japanese Patent Unexamined Publication No. Hei. 3-108564. Generally, such an air bag apparatus is provided with an air bag module which has a folded air bag, an inflator, etc. A conventional air bag apparatus 200 will be described in brief with reference to FIG. 3. FIG. 3 is a schematic perspective view showing an air bag apparatus disposed in a seat back and a state in which the air bag is inflated.

The aforementioned air bag module 201 is received in a module casing 202. The air bag module 201 is set up together with the module casing 202 in a seat back S2. When a car is run into at its side, that is, upon a side collision, a sensor detects this collision and a gas is generated by an inflator 201*a* thereby unfolding an air bag 204 so that an occupant is protected.

FIG. 1 is a sectional view taken along the line X—X in FIG. 3 and showing the inside of the module casing 202. In the conventional air bag module 201, the air bag 204 is set up as shown in FIG. 1.

That is, the air bag 204 is folded stepwise, while alternately turning back at opposite ends was repeated to a forward end portion 204*b* after a holder 201*b* for holding the inflator 201*a* was enclosed in a base end portion 204*a*.

When the air bag 204 is inflated, a propellant in the inflator 201*a* is ignited so that a gas is generated to be fed into the air bag 204 (see the arrows in FIG. 1). As a result, the air bag 204 is inflated thereby forcing a cover portion 202*a* of the module casing 202 to open as indicated by the two-dot chain line in FIG. 1. The air bag 204 is further inflated continuously so as to be inflated while rupturing a seam portion in the right portion of the seat back S2 (see FIG. 3). FIG. 2 is a side view typically showing the inflating process of the air bag 104. FIG. 2A shows an initial state of inflating; FIG. 2B shows a state after a predetermined time is passed from the start of inflating; and FIG. 2C shows a state after inflation is completed.

In the conventional air bag module 202, the air bag 204 is folded alternately so that the opposite sides of the folded air bag 204 superimpose on one another completely. Therefore, it is inevitable that the air bag 204 must be inflated gradually from the base end portion 204*a* side. There is the possibility that inflating might be obstructed a little by a certain time lag with respect to the time required for gas to reach the forward end portion 204*b* of the air bag 204, or obstructed by failure of the folds of the air bag 204 in the middle of inflating.

With respect to the inflating of the air bag 204, it is very important that the air bag can be inflated rapidly to respond instantaneously to a car side collision. Accordingly, not only the inflating of the air bag 204 needs to be performed as rapidly as possible but also secure inflation of the air bag 204 needs to be attained.

In addition, such an air bag apparatus gives priority to the protection of the chest or head of an occupant. Accordingly, the air bag in the air bag apparatus is required to be inflated in a comparatively high position, such as the chest level, of the occupant. To unfold the bag in a comparatively high position, such as at the chest level of the occupant, To unfold the bag in a comparatively high position, such as at the chest level of the occupant, conceivably the module is received in a high position of the seat back.

A side portion of the seat back is, however, generally designed so as to be thinner higher up the seat back for the purpose of the occupant's comfort when riding. Accordingly, if the module is received in a high position of the side portion of the seat back, there is a disadvantage in spoiling the occupant's comfortable feeling when riding. Accordingly, the module is required to be received in a position as low as possible in the side portion of the seat back.

SUMMARY OF THE INVENTION

An object of the present invention is to inflate the air bag of the present invention more quickly and to prevent inflating failure from occurring.

In order to solve the above problem according to a first aspect of the present invention, there is provided an air bag apparatus comprising an air bag folded and disposed in a seat back, the air bag being adapted to be inflated with a gas generated by an inflator thereby protecting an occupant, wherein, the air bag includes a pair of base cloth portions which superimpose on each other so as to be shaped like a bag, the pair of base cloth portions being formed so that, when the air bag is folded, the pair of base cloth portions are folded individually in the form of bellows so as to form a gas flow passage between the pair of base cloth portions.

By the aforementioned means, the gas generated by the inflator is made to reach the forward end portion of the air bag through the passage easily. Accordingly, not only inflation of the air bag is performed rapidly but also inflating failure is effectively prevented from occurring.

In addition to this, it is also an object of the present invention to make it possible to protect a comparatively high position, such as the chest portion, of an occupant, even in the case where a module is received in a low position of a side portion of a seat back so as not to spoil occupant's comfort when riding.

In order to solve the above problem, according to a second aspect of the present invention, there is provided an air bag apparatus comprising an air bag, disposed in a side portion of a seat back, in a condition such that it is attached to a module and folded, the air bag being adapted to be inflated with a gas generated by an inflator so as to be inflated between an occupant and an inner surface of a side portion of a vehicle body in the event of a vehicle collision, wherein, the air bag includes a base end portion and a protective portion which are designed so that the base end portion is adapted to be inflated directly in an upward direction, more upward than a direction perpendicular to a longitudinal direction of the module, whereas the protective portion is adapted to be inflated forward.

According to the present invention, the module is received in a low position of the side portion of the seat back so that a comparatively high position, such as the chest, of the occupant can be protected securely without spoiling occupant's comfort when riding.

BRIEF DESCRIPTION OF THE DRAWINGS

FIG. 2 is a side view showing the inflation of the air bag in the conventional air bag apparatus.

FIG. 9A shows an initial state of inflating; FIG. 9B shows a state after a predetermined time is passed from the start of inflating; and FIG. 9C shows a state after inflating is completed.

DETAILED DESCRIPTION OF THE PREFERRED EMBODIMENTS

Embodiments of the present invention will be described specifically below with reference to the drawings.

Figure 1:
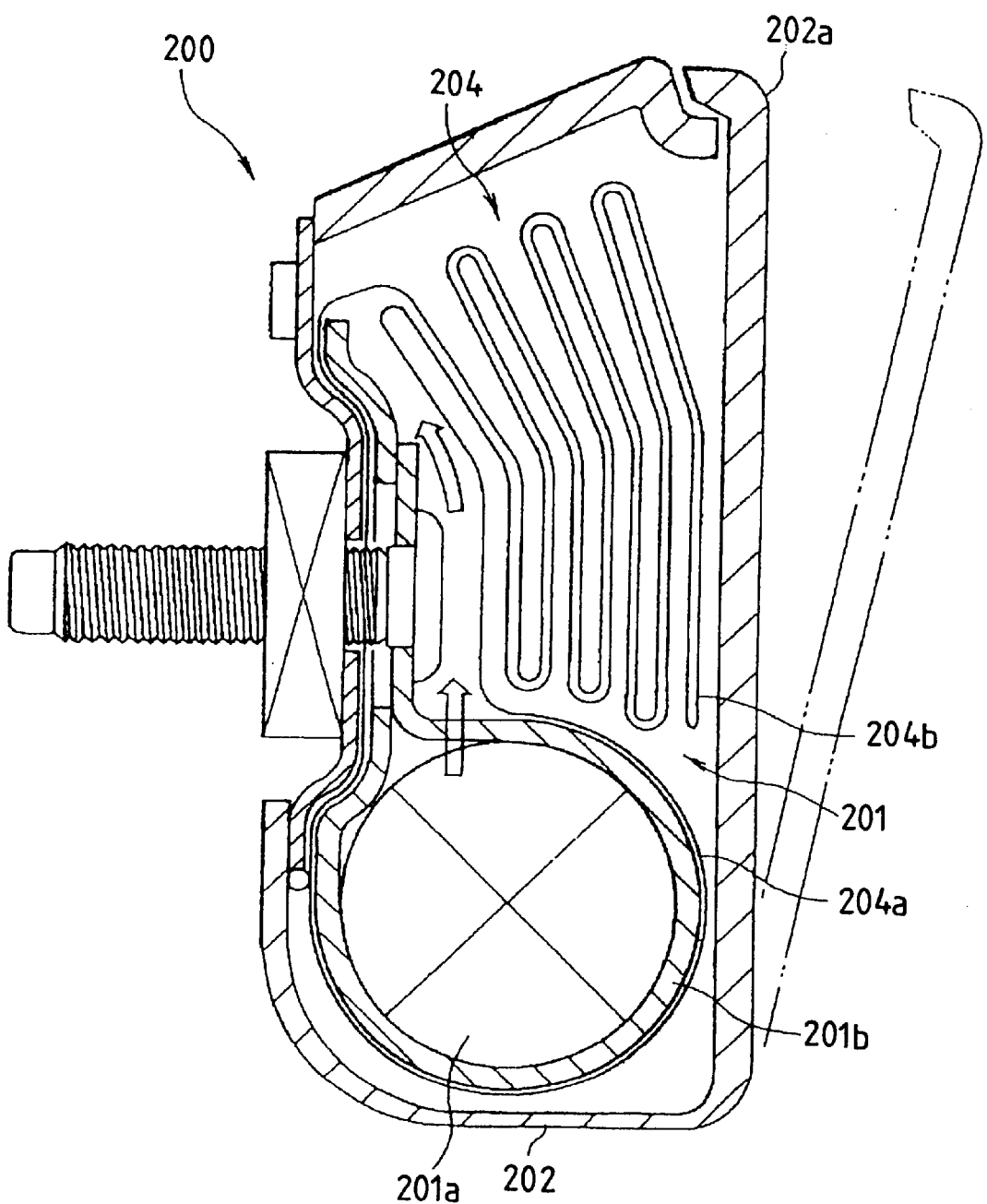
FIG. 1 is a sectional view taken along the line X—X in FIG. 3 in the case where a conventional air bag apparatus is disposed.
Figure 2A:
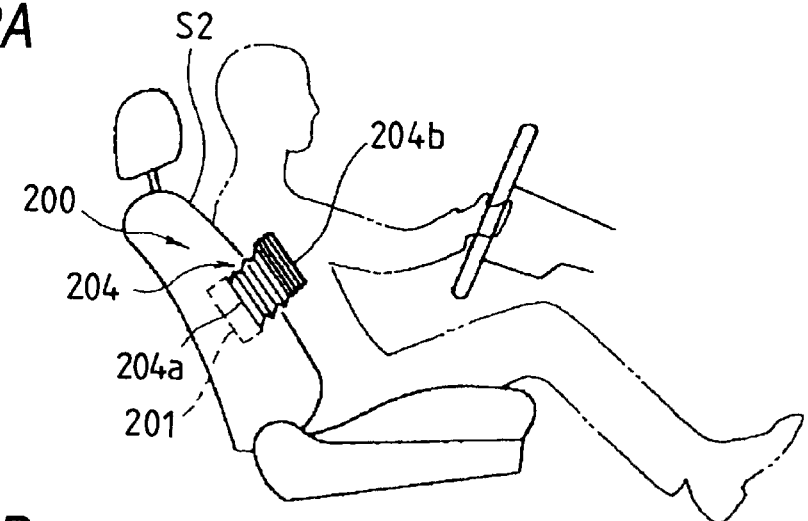
FIG. 2A shows an initial state of inflating.
Figure 2B:
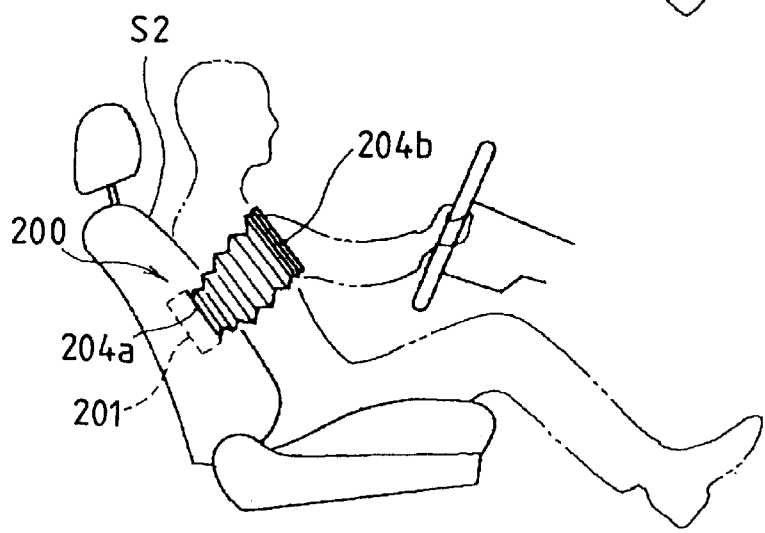
FIG. 2B shows a state after a predetermined time is passed from the start of inflating.
Figure 2C:
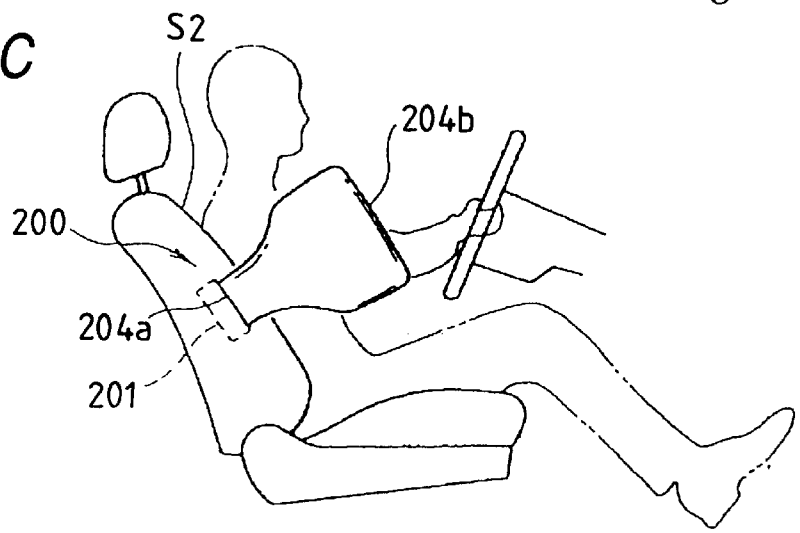
FIG. 2C shows a state after inflating is completed.
Figure 3:
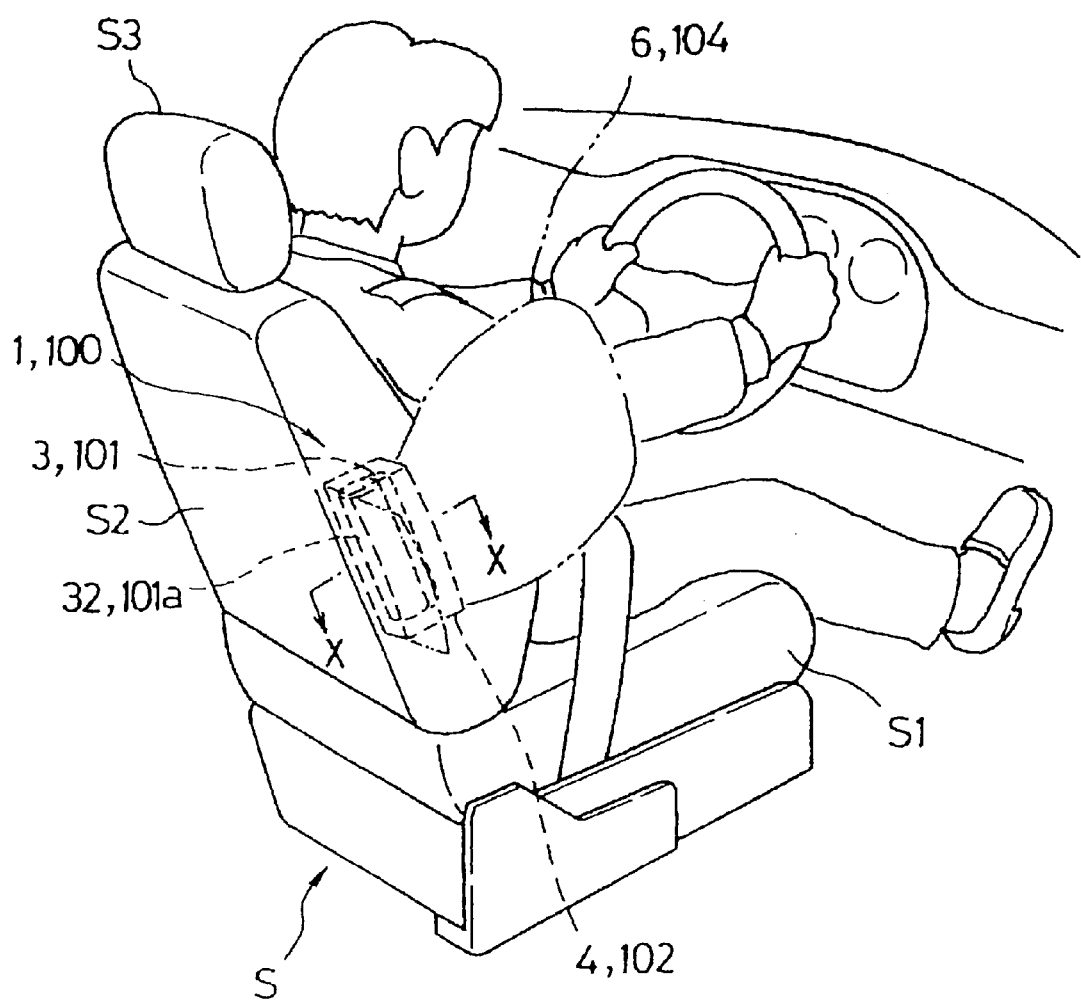
FIG. 3 is a schematic perspective view showing an air bag apparatus, according to the present invention, disposed in a seat back and a state in which the air bag is inflated.
Figure 4:
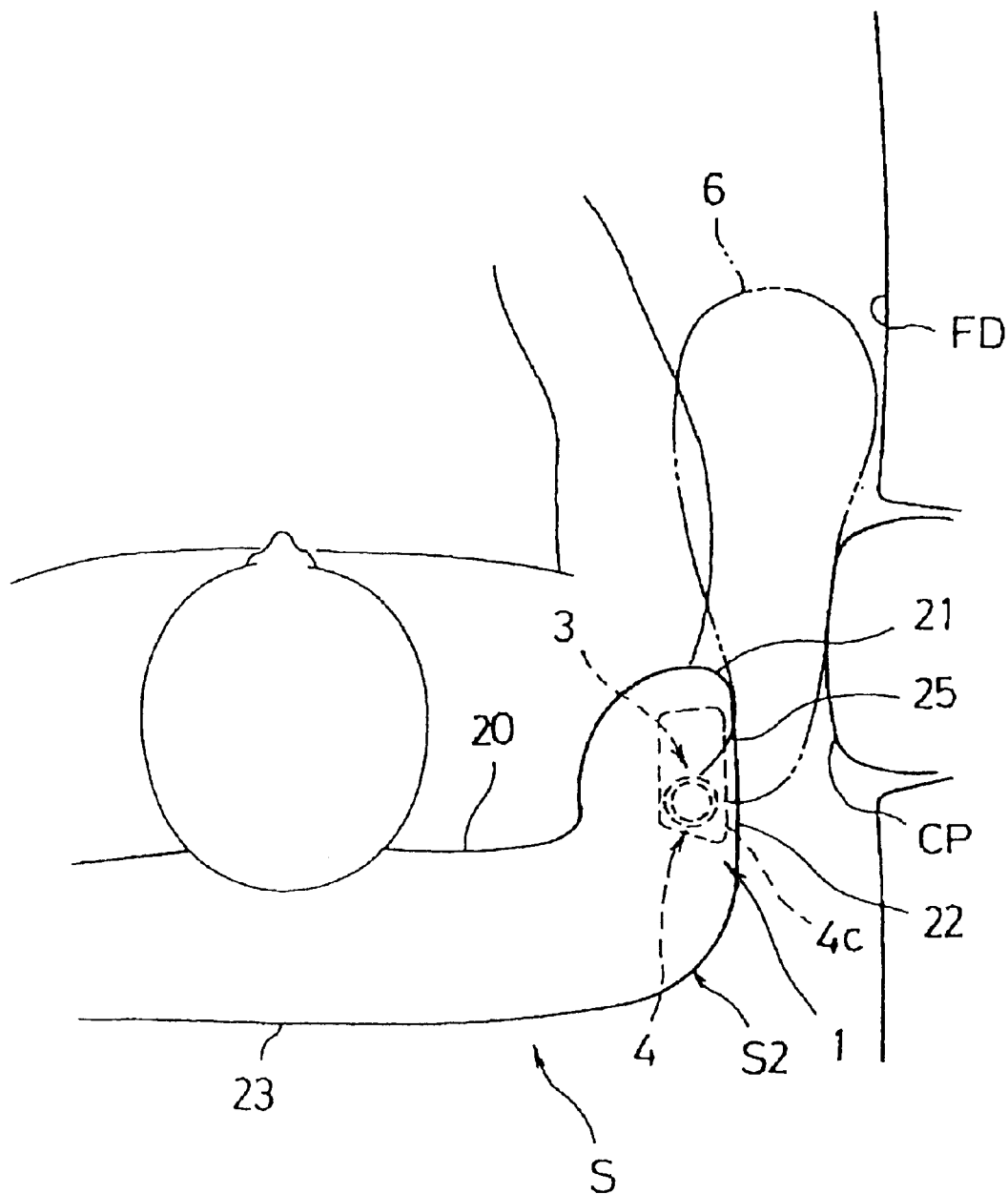
FIG. 4 is a plan view of an inflated state of the air bag viewed from the top.

An air bag apparatus 1 according to a first embodiment is disposed in the inside of a side portion of a seat back S2 in the same manner as in FIG. 3, referred to in the conventional technique. Referring now to FIGS. 3 and 4, the arrangement of the air bag apparatus 1 and a front seat S on the right side of a car will be described. FIG. 4 is a plan view of an inflated state of the air bag 6 viewed from the top.

As shown in FIG. 3, the front seat S on the right side of the car is constituted by a seat cushion S1 disposed substantially horizontally, a seat back S2 extending upward from a rear end of the seat cushion S1, and a head rest S3 provided at an upper end of the seat back S2.

As shown in FIG. 4, a center pillar CP faces a right side surface of the seat back S2. A front door FD is disposed in front of the center pillar CP. An air bag module 3, received in a module casing 4, is positioned in the inside of the right side of the seat back S2 of the front seat S. Incidentally, in the setting of the air bag module 3, the module casing 4 is placed with a cover portion 4c which turns to the outer side (right side in FIG. 4) and with a hinge portion 4b which turns to the rear side.

As shown in FIG. 4, a frontal center portion of the seat back S2 is covered with a first coating material 20 and left and right, opposite side and upper portions of the first coating material 20 are covered with a second coating material 21. Further, left and right, opposite side and upper surfaces of the seat back S2 connected to the second coating material 21 are covered with a third coating material 22. Further, a rear surface of the seat back S2 is covered with a fourth coating material 23. The respective coating materials 20, 21, 22 and 23 are sewn together with one another in side edge portions. A side seam portion 25 is formed particularly in a place where the second and third coating materials 21 and 22 are sewn together.

When the air bag module 3 is operated, the air bag 6 is inflated thereby forcing the cover portion 4c of the module casing 4 to open and then break and open the side seam portion 25 of the seat back S2. The air bag 6 is further inflated continuously, so that the air bag 6 is inflated obliquely forward so as to come between the right side of the occupant sitting on the front seat S and the left side of the center pillar CP and the front door FD.

Figure 5:
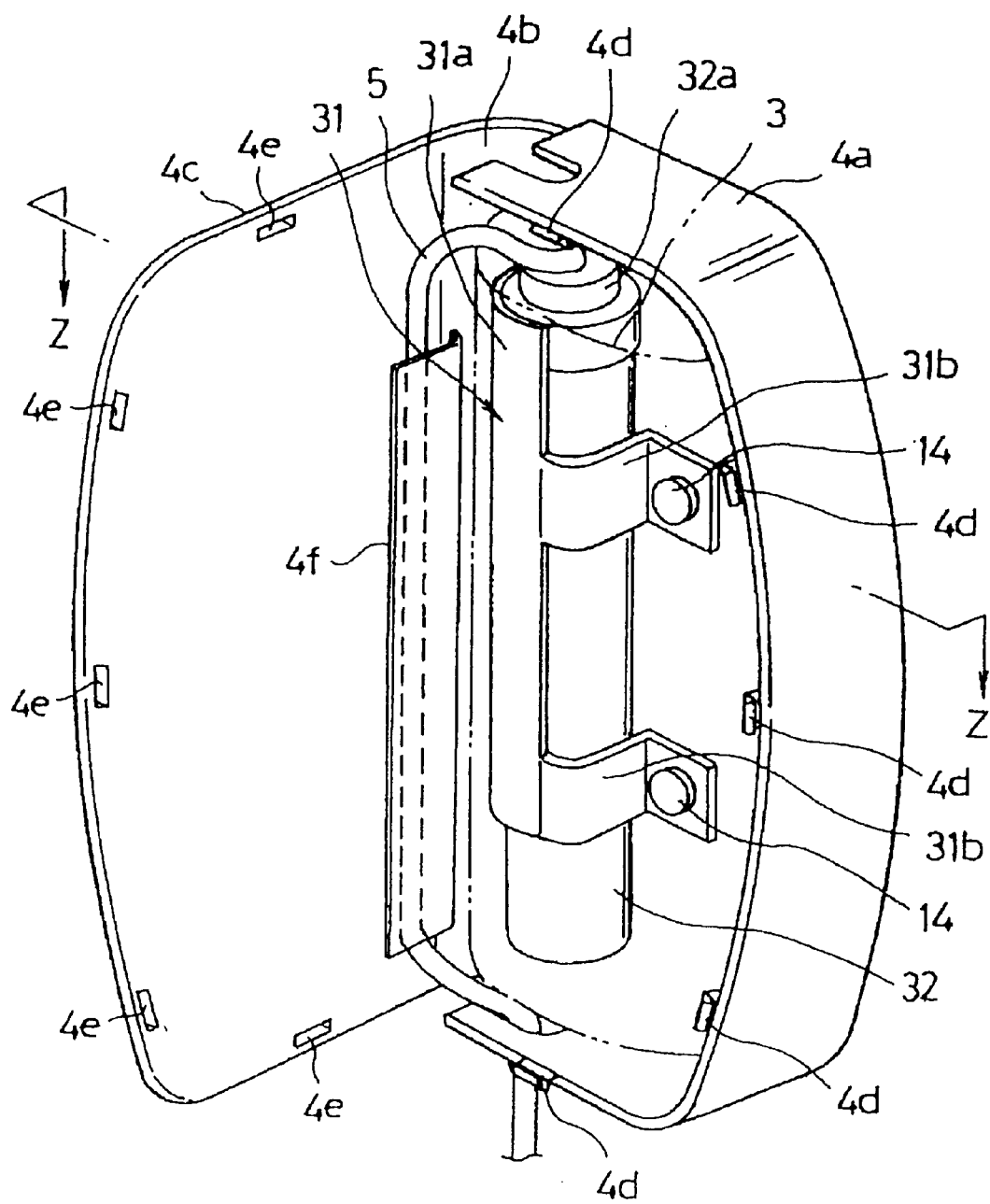
FIG. 5 is a perspective view of the module casing which is set up in the seat back so the air bag can be received in the module casing.

Next, the structure of the air bag module 3 will be described with reference to FIGS. 5 and 6. FIG. 5 is a perspective view of the module casing attached into the seat back in a state in which the air bag module can be received in the module casing; and FIG. 6 is a sectional view taken along the line Z—Z in FIG. 5.

Figure 6:
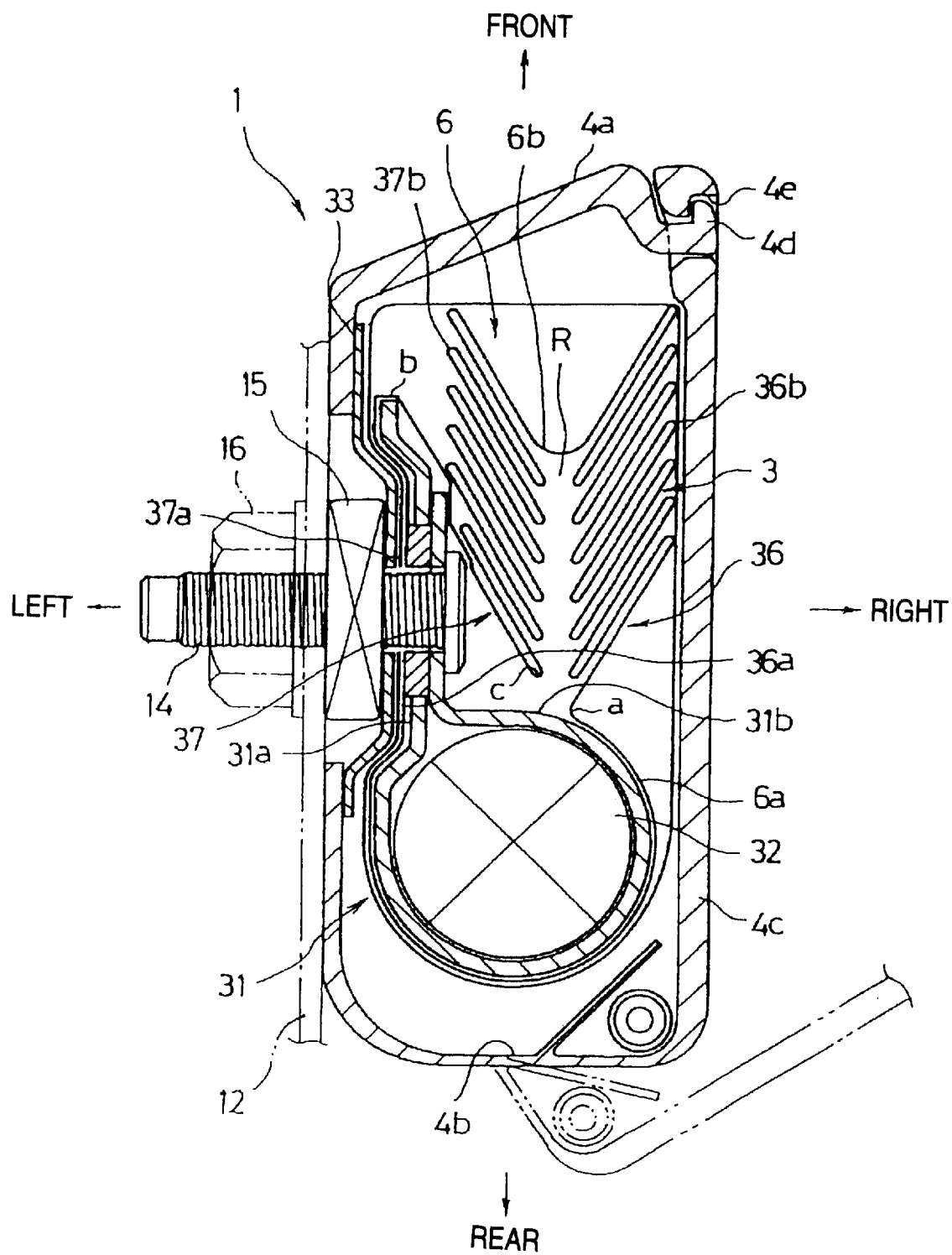
FIG. 6 is a sectional view taken along the line Z—Z in FIG. 5.

As shown in FIG. 6, a holder 31 of a metal has a body portion 31a substantially J-shaped in a sectional view, and a pair of clamp portions 31b, 31b extending from one side edge of the body portion 31a and shaped so as to be curved substantially circularly. Further, as shown in FIG. 5, the pair of clamp portions 31b are formed in upper and lower positions along a longitudinal direction of the body portion 31a.

A substantially cylindrical inflator 32 containing a propellant is fitted into a circular sectional portion which is formed by the body portion 31a and the pair of clamp portions 31b, 31b. The inflator 32 is fastened to the holder 31 by bolts 14, 14 and nuts 15, 15, so as to be held while being integrated with the holder 31. The integrated inflator 32 is enclosed in a base end portion 6a of the air bag 6. A forward end portion 6b of the air bag 6 is folded. A combination of the folded air bag 6, the inflator 32, etc. as described above is the air bag module 3.

The air bag module 3 is received in the inside of the module casing 4, integrally formed from a synthetic resin. The module casing 4 has a tray-like body portion 4a which opens to the right side of the car body, and a cover portion 4c connected to a rear edge of the body portion 4a through a hinge portion 4b. When five stoppage teeth 4d, 4d, . . . provided in upper, front and lower edges of the body portion 4a are fitted into five stoppage cavities 4e, 4e . . . provided in upper, front and lower edges of the cover portion 4c respectively, the cover portion 4c is fixed so as to cover an opening of the body portion 4a.

Further, the aforementioned air bag module 3 is attached, together with the module casing 4, to an air bag module attachment bracket 12 by bolts 14, 14 and nuts 16, 16.

Incidentally, the air bag module attachment bracket 12 is fixed to a pipe frame which serves as a skeleton of the seat back S2, so that the air bag module 3 is fastened in a predetermined position.

Incidentally, in FIG. 5, the reference numeral 5 designates a harness for supplying an electric current to an igniter 32a; and 4f designates a holding cover portion for holding and protecting the harness 5.

Figure 7A:
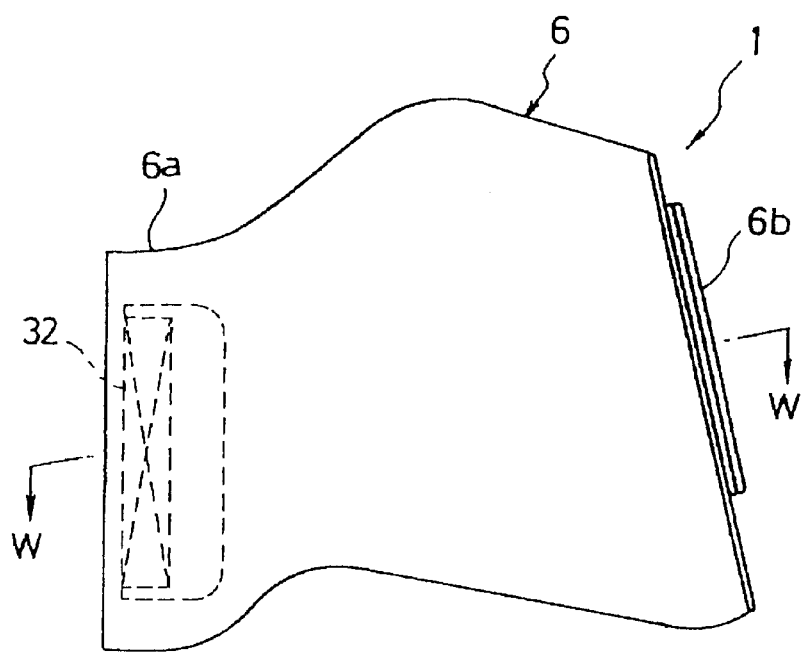
FIGS. 7A–7C are side views of a process of folding the air bag.
Figure 7B:
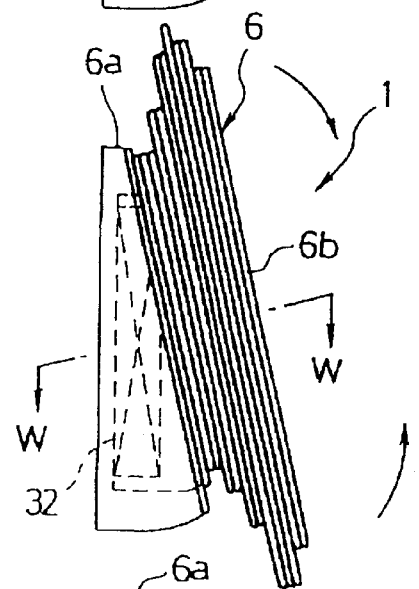
Figure 7C:
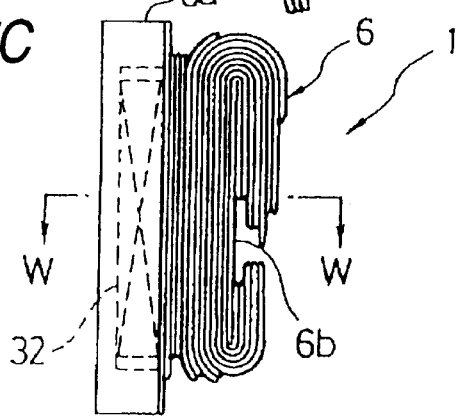
Figure 8A:
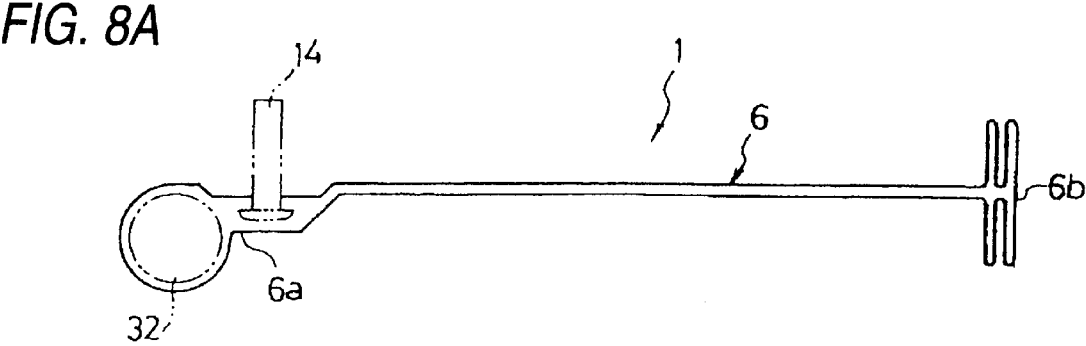
FIGS. 8A–8C are sectional views taken along the line W—W in FIGS. 7A–7C respectively.
Figure 8B:
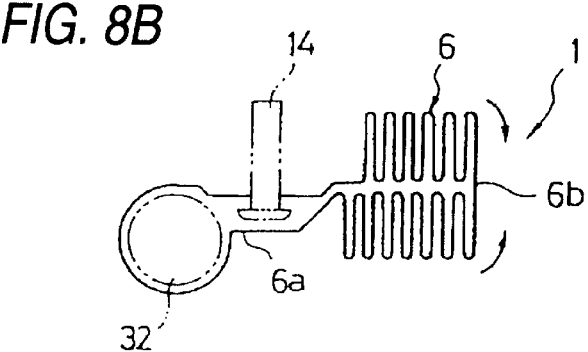
Figure 8C:
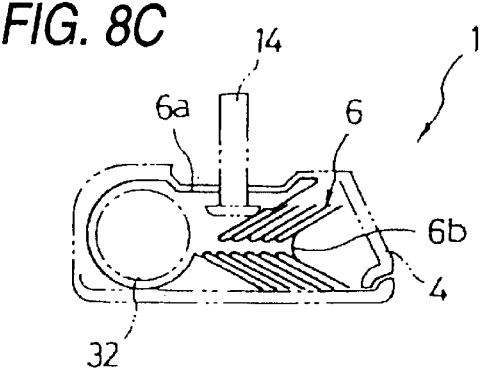

Folding of the air bag 6 at the time of formation of the air bag module 3 has been already described. Folding in this embodiment is, however, intrinsically different from folding in the conventional technique. Hence, folding of the air bag 6 will be described specifically with reference to FIGS. 6, 7 and 8. FIGS. 7 and 8 show in a stepwise manner a process of folding the air bag. FIG. 7 is a side view of the air bag; and FIG. 6 is a sectional view taken along the line W—W in FIG. 7. FIGS. 8A, 8B and 8C correspond to FIGS. 7A, 7B and 7C respectively.

The air bag 6 according to this embodiment is made from a piece of cloth shaped like a flat bag by folding the piece of cloth in two at its center and sewing its superimposed on circumferential edges together. Respective portions superimposed on each other so as to serve as sides of the bag are equivalent to the "base cloth portions" of the claims. In FIG. 6, the base cloth portion, designated by the reference numeral 36, is an outer side (right side) base cloth portion and the base cloth portion, designated by the reference numeral 37, is an inner side (left side) base cloth portion. Alternatively, the base cloth portions 36 and 37 may be formed by superimposing two independent pieces of cloth and sewing their circumferential edges together so as to be shaped like a bag or by use of cloth initially shaped like a bag without the necessity of sewing.

As shown in FIG. 6, the inflator 32, etc. are enclosed in the base end portion 6a of the air bag 6. Base portions 36a and 37a of the pair of base cloth portions 36 and 37 are put between the body portion 31a of the holder 31 and a side plate 33 and fastened and fixed by bolts 14, 14. The base portion 36a of the base cloth portion 36 goes round by a rear surface of the inflator 32 from the inner side (left side in FIG. 6) to the outer side (right side in FIG. 6) of the car body so as to enclose the inflator 32 at about 360°. The position where the inflator 32 is enclosed in the base portion 36a is a point "a". The front side extending forward from the point a is a foldable portion 36b. On the other hand, the base portion 37a of the base cloth portion 37 on the right side of the car body extends forward along the inner side (left side in FIG. 6) of the body portion 31a, turns back around a point "b" at the front end of the body portion 31a and returns forward at a point "c" which is a position in front of the inflator 32. That is, the front side of the air bag 6 returned at the point c is a foldable portion 37b.

Further, a portion of from the point b to the point c in the base cloth portion 37 (on the left side in FIG. 6) of the air bag 6 is disposed so as to be along the right surface of the body portion 31a of the holder 31, so that the portion is provided as a surplus portion "b~c." When the air bag 6 is inflated, the surplus portion b~c first rotates counterclockwise around the point b so as to be widened. As a result, the air bag 6 can be inflated rightward (laterally outward) easily. Accordingly, both the opening of the module casing 4 and the rupture of the side seam portion 25 (see FIG. 4) can be performed accurately.

As shown in FIGS. 7A and 8A, the foldable portions 36B and 37B of the inflated air bag 6 are folded individually from the front side to the rear side in the form of bellows. Further, as shown in FIG. 6, respective turns which form the bellows are provided so that the left and right foldable portions 36b and 37b do not engage with each other. Thus, a predetermined passage "R" is formed near the center. The passage R serves as a route for leading the gas from the inflator 32 to the forward end portion 6b of the air bag 6. After the air bag 6 is folded up to a position shown in FIGS. 7B and 8B, that is, up to a position where the air bag module 3 is enclosed, upper and lower portions of the folded air bag 6 are bent downward and upward respectively (see FIG. 7(c)) so that the vertical height of the air bag 6 is reduced (see the arrow in FIG. 7(b)). After the folding, the folded air bag 6 is further bent in directions of the arrows in FIG. 8B, that is, laterally opposite half portions of the air bag 6 are squashed so as to fall forward so that the lateral width of the air bag 6 is reduced.

The folded air bag 6 is then packed in a protective cover compactly so that the air bag 6 does not come apart from the inflator 32, the holder 31, etc. As shown in FIG. 8C, the packed air bag 6 is received in the module casing 4. The protective cover never disturbs the inflation of the air bag 6 because the protective cover is ruptured easily.

Further, when the air bag 6 is folded while the passage R is formed in the manner as described above in this embodiment, the gas being sent from the inflator 32 pushes out the forward end portion 6b of the air bag 6 before the respective foldable portions 36b and 37b are inflated. As a result, not only the air bag 6 is inflated more quickly but also inflating failure is effectively prevented from occurring.

The operation of the air bag apparatus according to this embodiment will be described below.

When the inflator 32 generates a gas in a vehicle collision, the air bag 6 is inflated in the inside of the module casing 4. When an inflating pressure of the air bag 6 acts on the cover portion 4c of the module casing 4, the stoppage teeth 4d, 4d . . . are disengaged from the stoppage cavities 4e, 4e . . . As a result, the cover portion 4c rotates around the hinge portion 4b (see the chain line in FIG. 6), so that the body portion 4a is opened. Further, as shown in FIG. 4, when a pressure for opening the cover portion 4c is transmitted to the third coating material 22 of the seat back S2, the side seam portion 25 is ruptured so that the second coating material 21 and the third coating material 22 are separated from each other. As a result, the air bag 6, passed through a gap between the second coating material 21 and the third coating material 22, is inflated obliquely forward, in a top view, so as to be along both the center pillar CP and the front door FD.

Figure 9A:
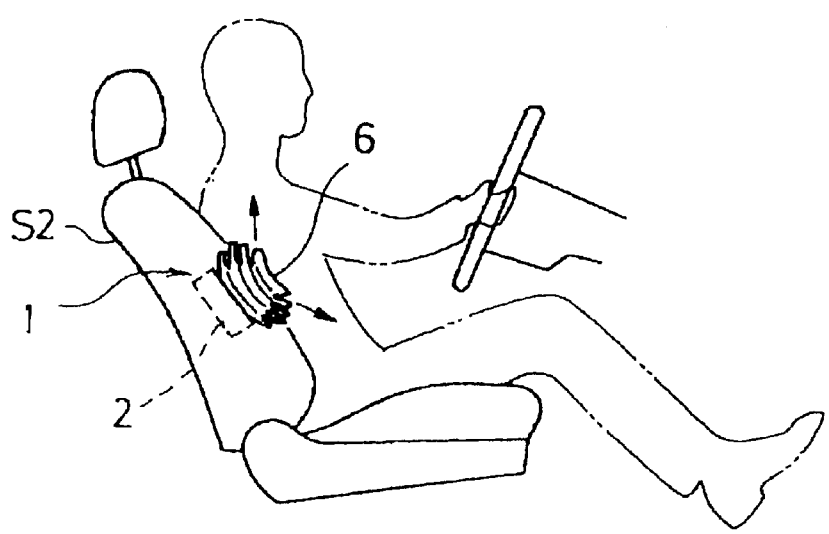
FIGS. 9A–9C are side views showing the inflation of the air bag in the air bag apparatus.

FIG. 9 is a view showing the inflation of the air bag 6. As shown in FIG. 5, the air bag 6 is folded so that the gas passage R is formed in the center. Accordingly, the gas generated by the inflator 32 directly strikes the forward end portion 6b of the air bag 6. As a result, the air bag 6 begins to be inflated vertically and longitudinally as shown in FIG. 9A.

Figure 9B:
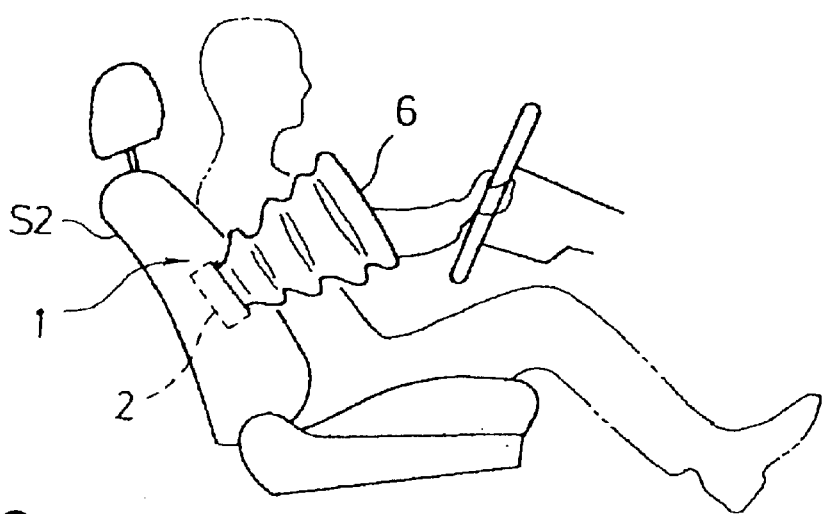
Figure 9C:
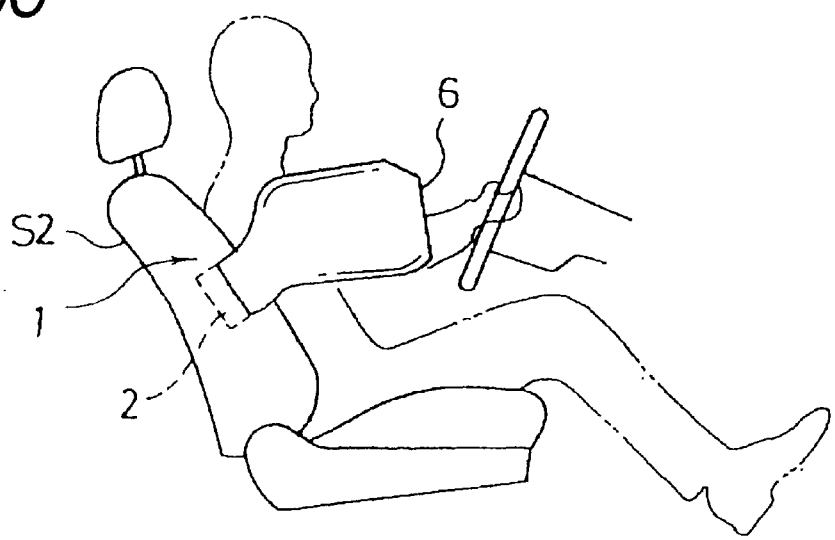

Further, the air bag 6 is inflated evenly as a whole as shown in FIG. 9B. As a result, the air bag 6 goes into a perfectly inflated state quickly as shown in FIG. 9C. The perfectly inflated air bag 6 protects the occupant's chest, or the like, securely. Incidentally, since the air bag 6 is inflated longitudinally directly, the air bag 6 can be inflated more quickly than the conventional air bag.

A second embodiment of the present invention will be described specifically below with reference to the drawings.

Figure 10:
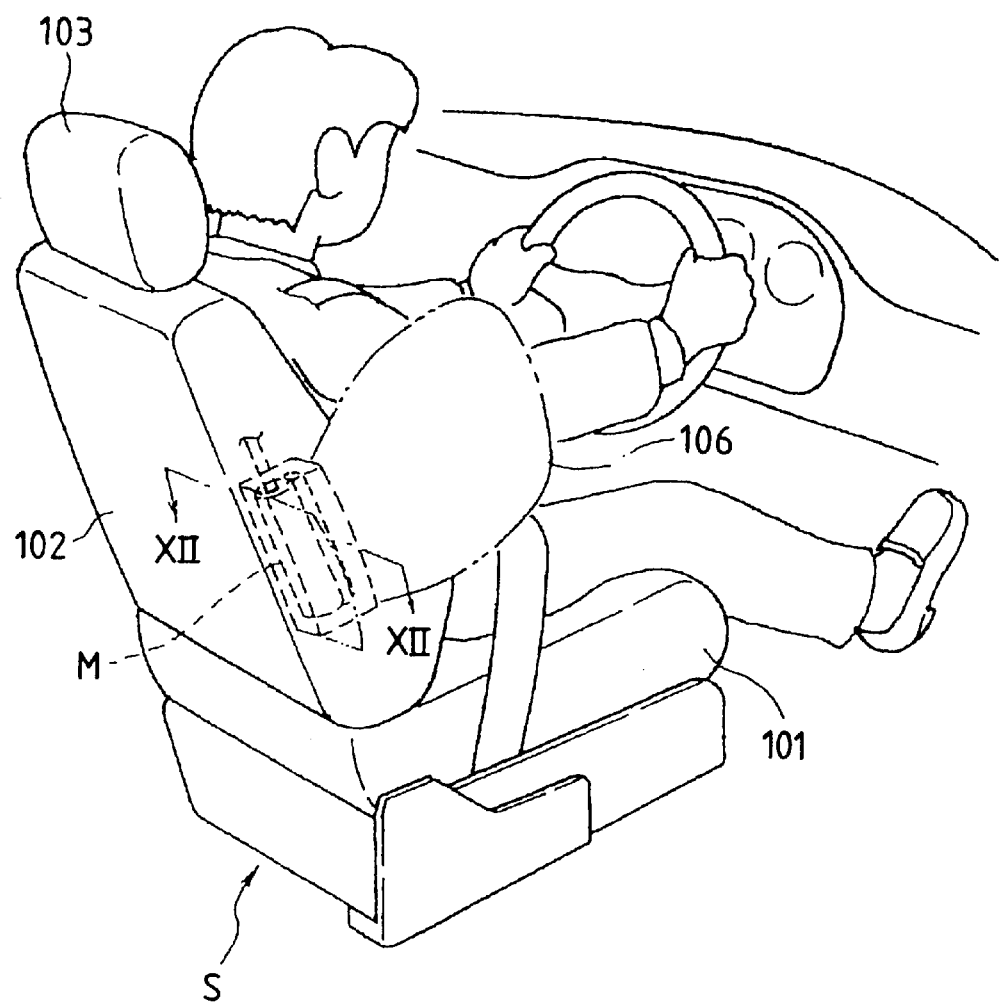
FIG. 10 is a perspective view of a seat equipped with an air bag apparatus according to the present invention.
Figure 11:
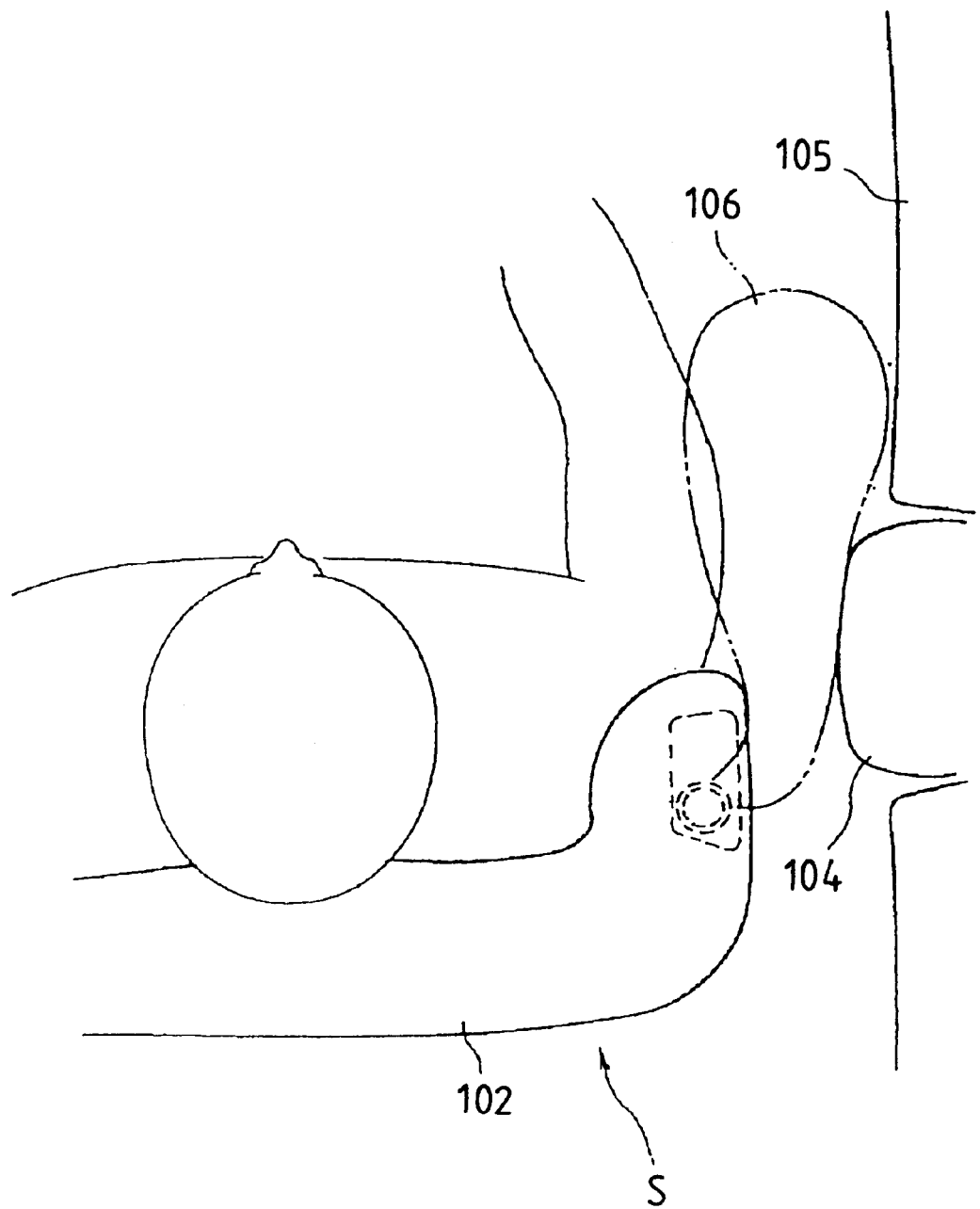
FIG. 11 is a plan view showing a state in which the air bag is inflated.

As shown in FIGS. 10 and 11, a right front seat S in a car is constituted by a seat cushion 1 disposed substantially horizontally, a seat back 102 extending rear upward from a rear end of the seat cushion 101, and a head rest 103 provided at an upper end of the seat back 102. A center pillar 104 faces a right side surface of the seat back 102. A front door 105 is disposed in front of the center pillar 104. A module "M" is received in the inside of the right side of the seat back 102 of the front seat S. When the module M is operated, an air bag 106 ruptures seam portions of the seat back 102 and forces them to open. Then, the air bag 106 is inflated obliquely forward so as to come between the right side of the occupant sitting on the front seat S and the left side of the center pillar 104 and the front door 105.

Figure 12:
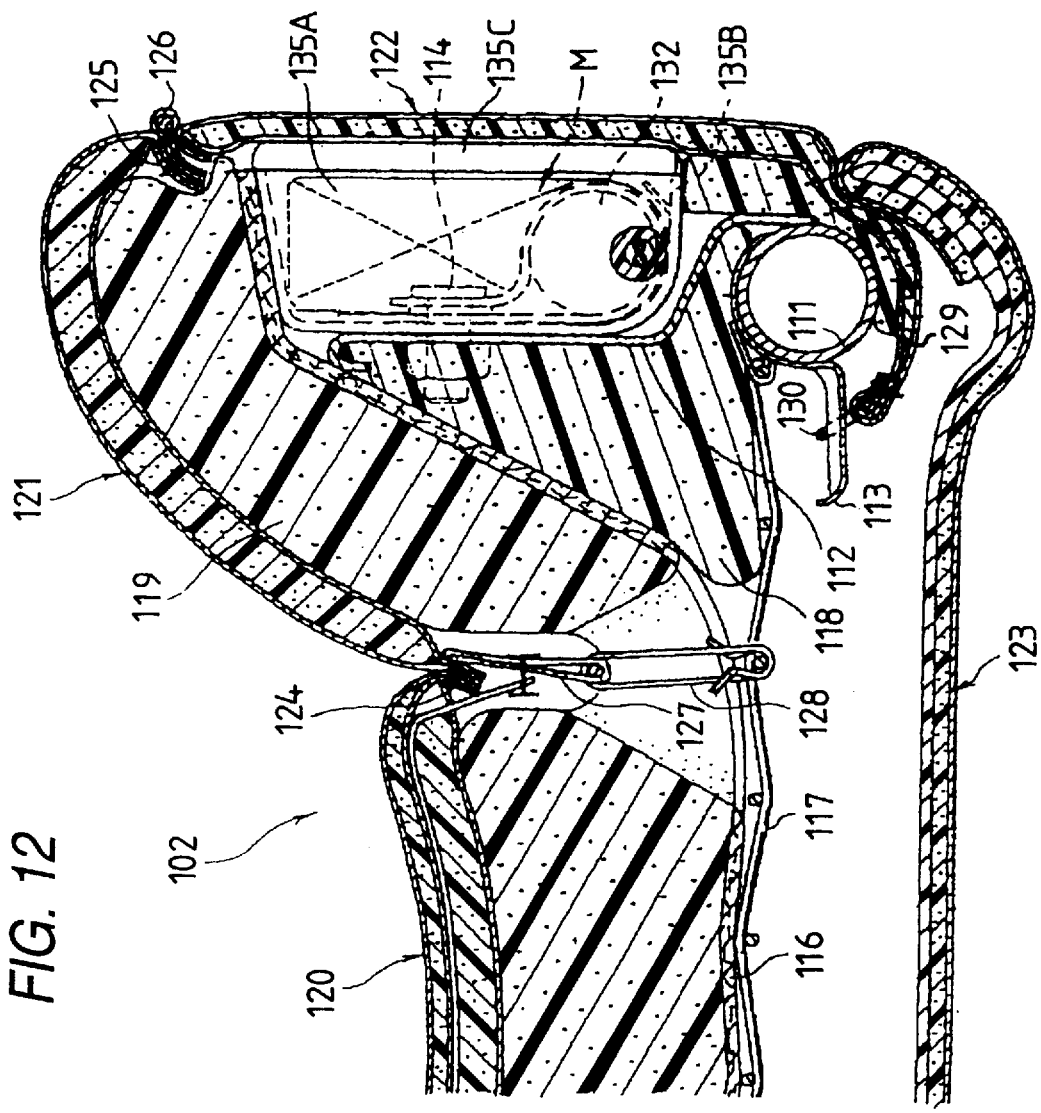
FIG. 12 is a sectional view taken along the line XII—XII in FIG. 10.

As shown in FIG. 12, both a metal module-attachment bracket 112, extending in the frontward direction of the car body and a metal retainer 113, extending in the inward direction of the car body, are fixed by welding to a pipe frame 111 extending vertically along a right edge of the seat back 102. The module M is fixed to the right side of the module-attachment bracket 112 by two bolts 114, 114 and two nuts 115, 115 (see FIG. 14).

Further, a shape-retaining material 116 constituted by a rough blanket extends from a front surface of the module M to a thickwise middle portion of the seat back 102 on the left side of the car body, so as to be connected to a pipe frame (not shown) on the left side of the car body. A mesh-like spring 117 having an end portion attached to the outside of the pipe frame 111 is set up in the rear of the shape-retaining material 116. A pad 118 of sponge is attached into a portion surrounded by the front surface of the spring 117, the rear surface of the shape-retaining material 116 and the side surface of the module-attachment bracket 112. Another pad 119 of sponge is attached to the front surface of the shape-retaining material 116.

A frontal center portion of the seat back 102 is covered with a first coating material 120. Opposite, left and right side portions as well as an upper portion of the first coating material 120 are covered with a second coating material 121. Further, opposite, left and right side surfaces, as well as an upper portion of the seat back 102 connected to the second coating material 121, are covered with a third coating material 122. Further, a rear surface of the seat back 102 is covered with a fourth coating material 123. The first coating material 120 and the second coating material 121 are sewn together in a seam portion 124. The second coating material 121 and the third coating material 122 are sewn together in a seam portion 125. In the seam portion 125, a ball edge 126 is sewn integrally.

On the other hand, a clip 128 is provided at an end of a tongue piece 127 extending from the seam portion 124. The clip 128 is hooked on a spring 117 thereby keeping both the first coating material 120 and the second coating material 121 in predetermined shapes. Further, another clip 130 is provided at an end of a tongue piece 129 extending from the seam portion at the rear end of the third coating material 122. The clip 130 is hooked on the retainer 113 thereby fixing the third coating material 122.

Figure 13:
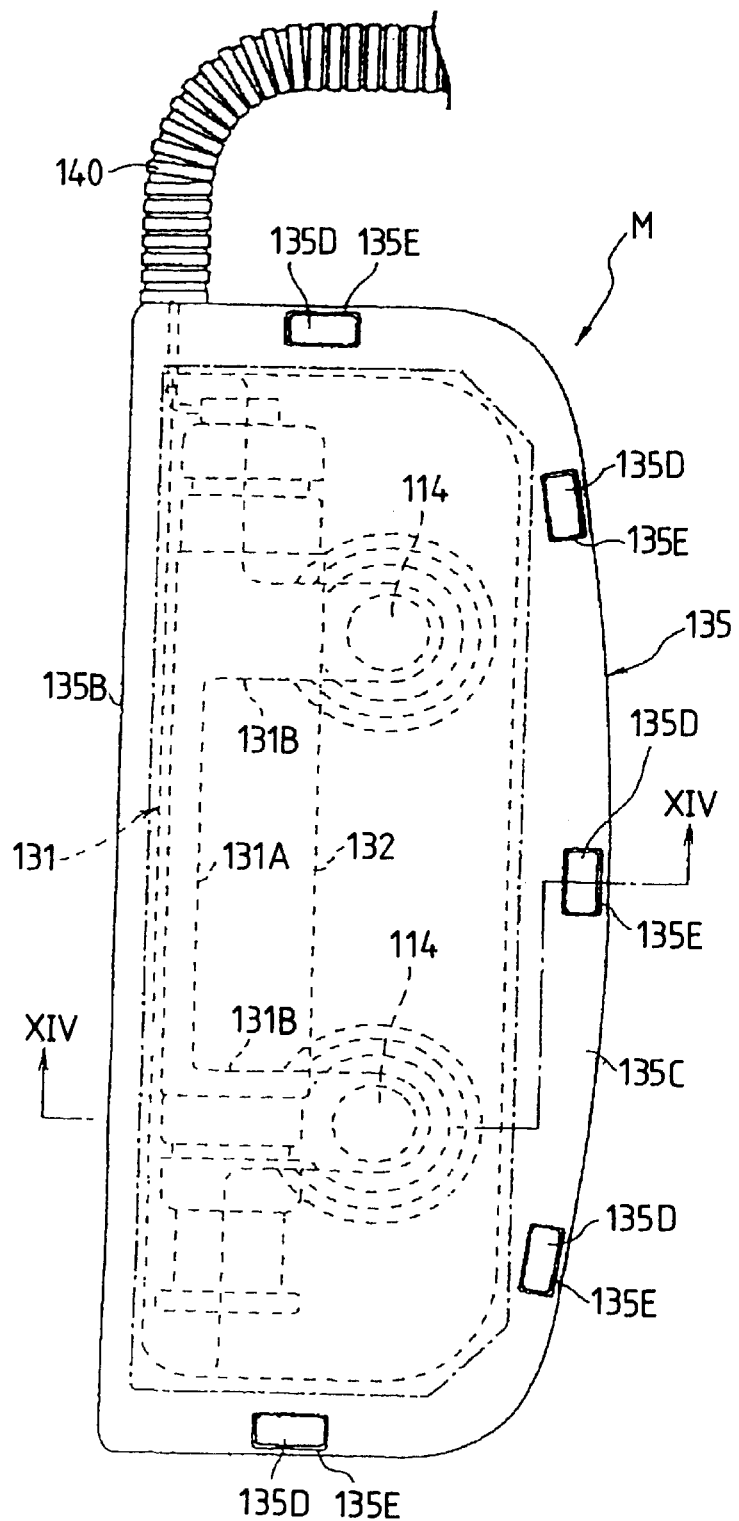
FIG. 13 is a side view of the air bag apparatus according to the present invention.
Figure 14:
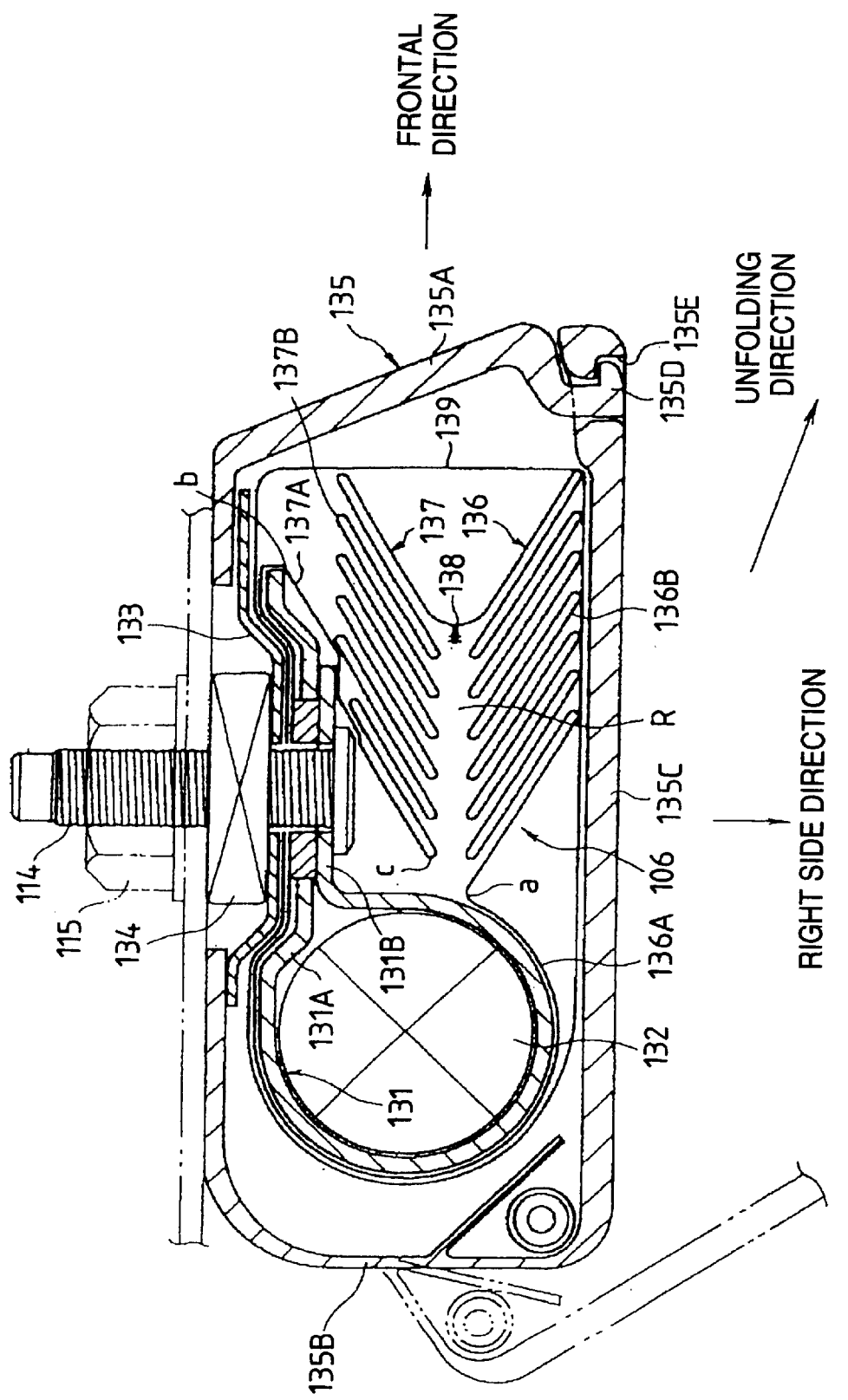
FIG. 14 is a sectional view taken along the line XIV—XIV in FIG. 13.

The structure of the module M will be further described with reference to FIGS. 12 through 14. As shown in FIGS. 13 and 14, a holder 131 of a metal has a body portion 131A substantially J-shaped in a cross-sectional view, and a pair of clamp portions 131B, 131B extending from one side edge of the body portion 131A. A substantially cylindrical inflator 132, filled with a propellant (not shown), is supported in a circular sectional portion which is formed by the body portion 131A and the pair of clamp portions 131B, 131B. Both the holder 131 and the inflator 132 are enclosed in a rear end portion of the folded air bag 106. The pair of bolts 114, 114 are fastened with nuts 134, 134 through the clamp portions 131B, 131B, the body portion 131A and a side plate 133 and further fastened with nuts 115, 115 through the module-attachment bracket 112.

The holder 131, the side plate 133, the inflator 132 and the folded air bag 106 are received in the inside of a module casing 135, integrally formed from a synthetic resin. The module casing 135 has a tray-like body portion 135A which opens to the right side of the car body, and a cover portion 135C connected to a rear edge of the body portion 135A through a hinge portion 135B. When five stoppage teeth 135D, 135D . . . provided in upper, front and lower edges of the body portion 135A are fitted into five stoppage cavities 135E, 135E . . . provided in upper, front and lower edges of the cover portion 135C respectively, the cover portion 135C is fixed so as to cover an opening of the body portion 135A. Incidentally, the reference numeral 140 designates a harness cover for protecting a harness which is not shown but connected to the inflator 132.

The shape of the air bag 106 in the air bag apparatus according to the present invention will be described below.

Figure 15:
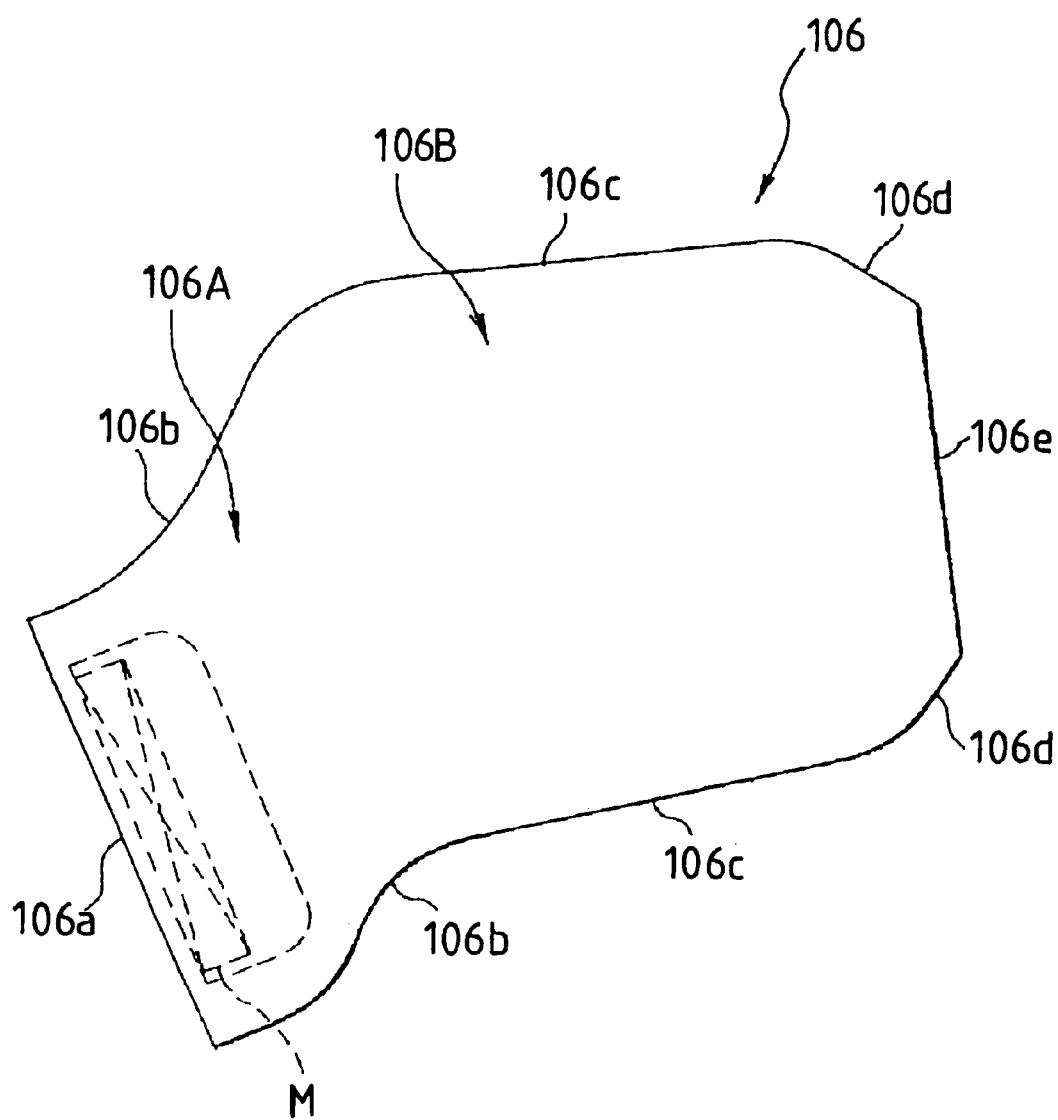
FIG. 15 is a side view showing an inflated state of the air bag.

As shown in FIG. 15, the air bag 106 is constituted by a base end portion 106A and a protective portion 106B. Describing the shape of the air bag 106, curved sides 106b, 106b extend from end portions, respectively, of a linear base end side 106a in the base end portion 106A so as to be curved upward. The air bag 106 is set up so that the base end side 106a is located along a longitudinal direction of the module M. The curved sides 106b, 106b have substantially the same shapes. Each of the curved sides 106b, 106b is formed so as to extend slightly upward, extend further upward and finally face substantially the horizontal direction. Further, forward extended sides 106c, 106c extend substantially horizontally from the curved sides 106b, 106b respectively. Further, bent sides 106d, 106d extend from the forward extended sides 106c, 106c respectively. The bent sides 106d, 106d are bent in the directions to approach each other downward and upward respectively. The bent sides 106d, 106d are connected to each other by a vertical side 106e. The air bag 106 has these sides so that the base end portion 106A is constituted by a portion surrounded by the base end side 106a and the curved sides 106b, 106b, whereas the protective portion 106B is constituted by a portion surrounded by the forward extended sides 106c, 106c, the bent sides 106d, 106d and the vertical side 106e.

The air bag 106 is received in the seat back 102 so that the vertical side 106e turns to a substantially vertical direction when the air bag 106, received in the seat back 102, is inflated. In this condition, the forward extended sides 106c, 106c turn to substantially horizontal directions.

Figure 16:
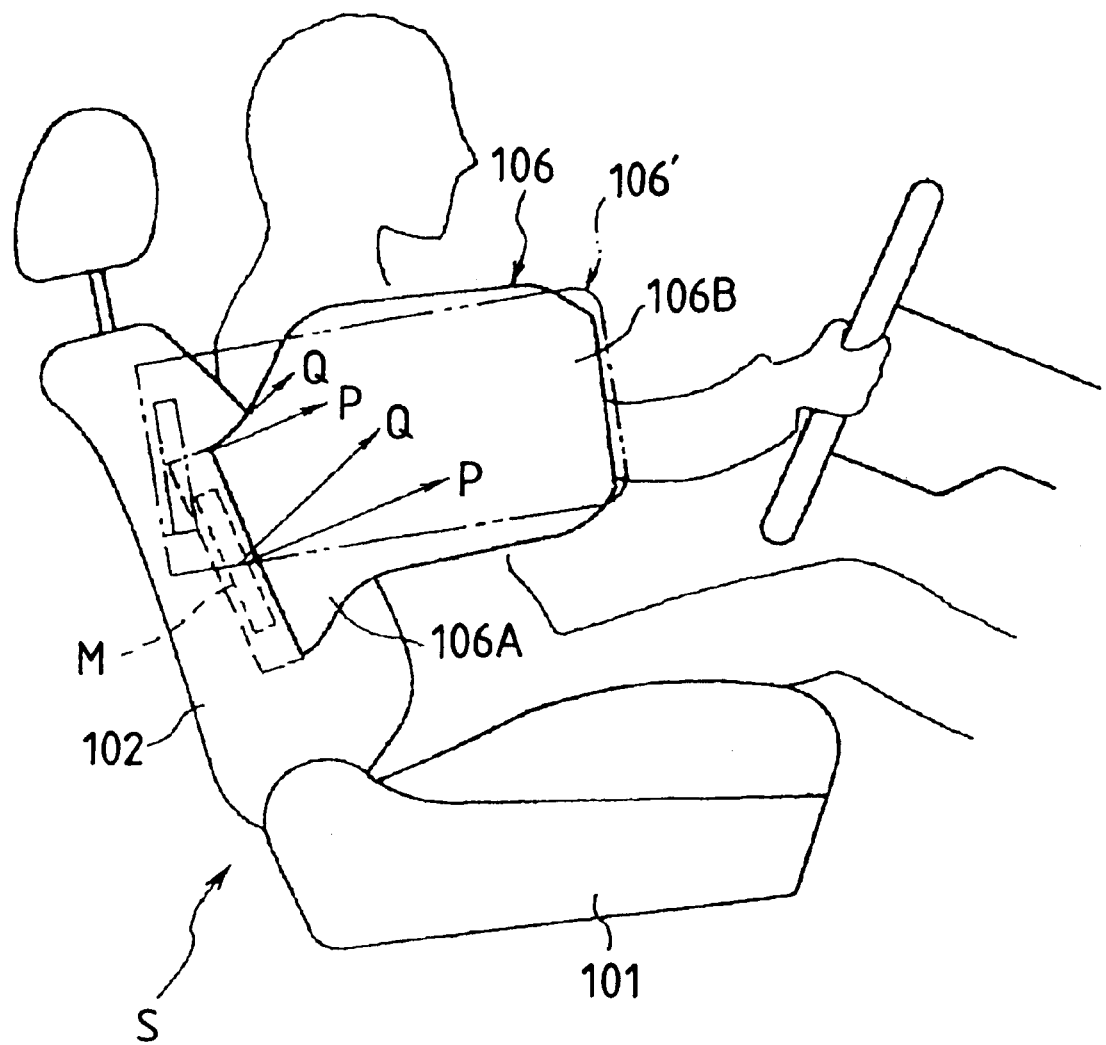
FIG. 16 is a side view showing an inflated state of the air bag and apparatus according to the present invention.

The air bag 106 having the aforementioned shape is received in the seat back 102. FIG. 16 shows a state in which the air bag 106 is inflated.

As shown in FIG. 16, the module M is disposed in a comparatively lower position along the direction of the height of the seat back 102. The base end portion 106A of the air bag 106 is inflated to an direction Q higher than a direction P perpendicular to the longitudinal direction of the module M.

Assuming now that the chest, or the like, of an occupant is to be protected by the air bag 106' inflated as a whole to a direction perpendicular to the longitudinal direction of the module M, then the module M must be received in an upper position of the seat back 102, as represented by the dashed line in FIG. 16. If the module M is disposed in an upper position of the seat back 102 as described above, the hardness of the module casing 135 containing the module M is transmitted to the occupant's back or shoulder thereby spoiling the occupant's comfort when riding because there is a little (thin) pad in the upper position of the seat back 102.

On the contrary, when the air bag 106 is formed so as to be inflated to an upward direction Q directing more upward than a direction P perpendicular to the longitudinal direction of the module M, as shown in the air bag 106 in the air bag apparatus according to the present invention, the air bag 106 can reach the occupant's chest, or the like, thereby protecting the occupant's chest and head securely even in the case where the module M is received in a lower position of the seat back 102. Accordingly, the module M can be disposed in a sufficiently thick lower position of the seat back 102. Accordingly, there is no fear that the hardness of the module casing 135 containing the module M is transmitted to the occupant's back or shoulder so that the occupant's comfort when riding is spoiled.

Further, while the base end portion 106A of the air bag 106 is inflated upward, the protective portion 106B of the air bag 106 is inflated forward. Thus, the occupant can be protected by the protective portion 106B securely.

A procedure of folding the air bag 106 will be described below with reference to FIGS. 17 and 18.

As shown in FIG. 14, the air bag 106, before folding, is shaped like a flat bag made from two pieces of base cloth 136 and 137 sewn together in an outer circumferential seam portion 138. The air bag 106 is fixed so that the holder 131 and the inflator 132 are enclosed in base portions 136A and 137A (rear end portions) of the two pieces of base cloth 136 and 137. More specifically with reference to FIG. 14, the base portions 136A and 137A of the two pieces of base cloth 136 and 137 are fastened and fixed by bolts 114, 114 passing through both the body portion 131A of the holder 131 and the side plate 133, while the base portions 136A and 137A are sandwiched between the body portion 131A of the holder 131 and the side plate 133. The base portion 136A of the base cloth 136 on the laterally outer side of the car body extends forward to a point a while enclosing the outer circumference of the inflator 132 at about 360° and then a foldable portion 136B on the front side of the base cloth 136 is folded from the point a. On the other hand, the base portion 137A of the base cloth 137 on the laterally inner side of the car body extends backward around a point b at the front end of the body portion 131A of the holder 131. After the base portion 137A is then turned forward at a point c in front of the inflator 132, a foldable portion 137B on the front side of the base cloth 137 is folded from the point c.

Figure 17A:
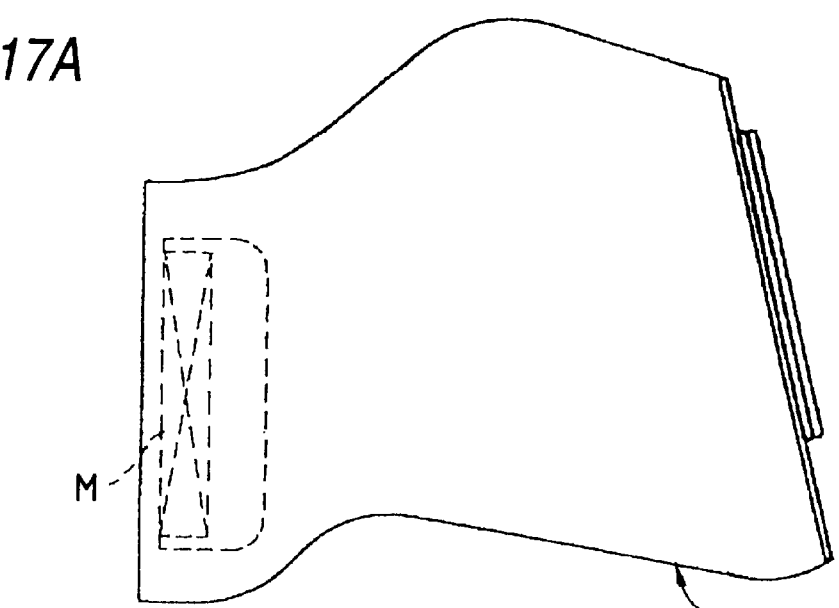
FIGS. 17A–17C are side views showing a process of folding the air bag.
Figure 17B:
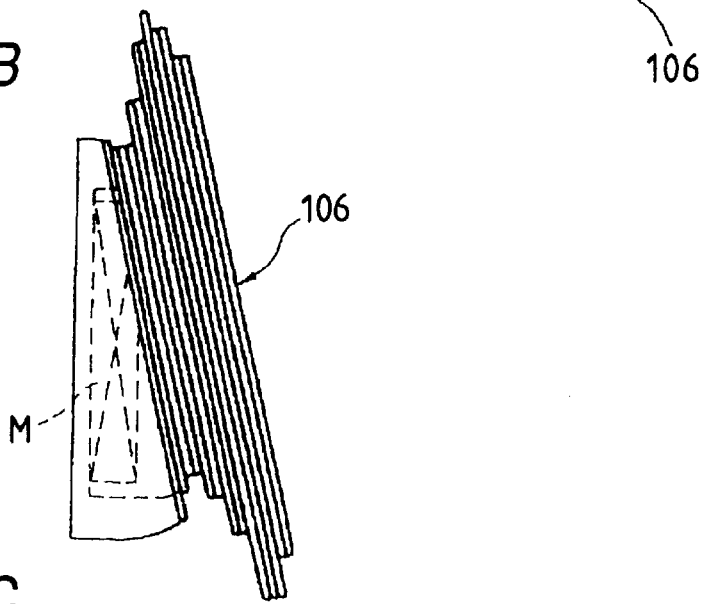
Figure 17C:
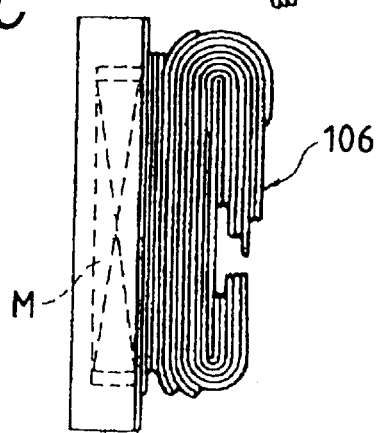
Figure 18A:
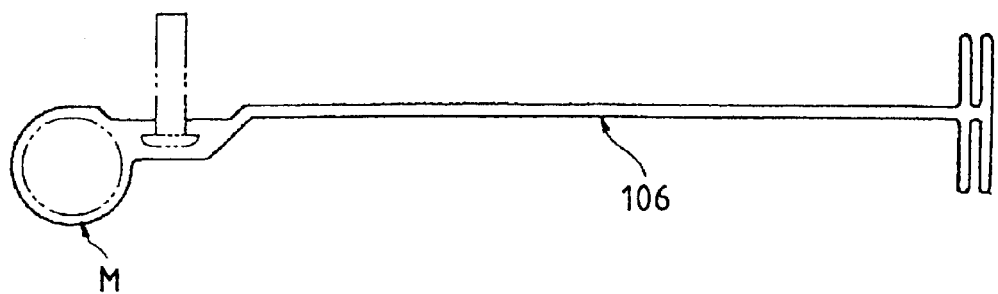
FIGS. 18A–18C are plan views showing a method of folding the air bag.
Figure 18B:
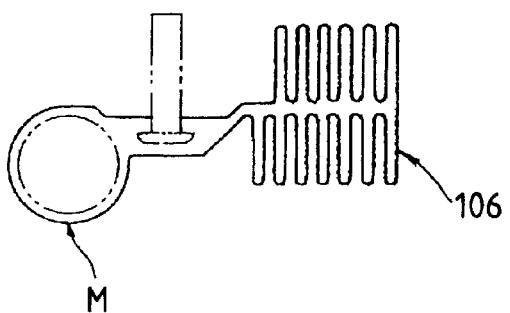
Figure 18C:
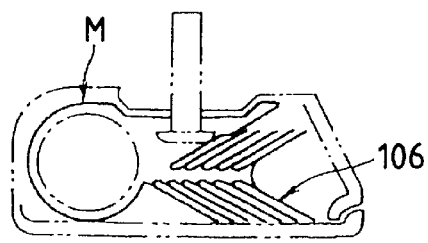

In the air bag 106 inflated as shown in FIG. 15, the foldable portions 136B and 137B are folded from the front side to the rear side in the form of bellows as shown in FIGS. 17(a) and 18(a). Succeedingly, the air bag 106 is folded to a state shown in FIGS. 17(b) and 18(b). Then, as shown in FIG. 17(c), upper and lower portions of the folded air bag 106 are folded downward and upward respectively so that the vertical height of the air bag 106 is reduced. Further, as shown in FIG. 18(c), laterally opposite half portions of the folded air bag 106 are squashed so as to fall forward so that the lateral width of the air bag 106 is reduced.

Figure 19:
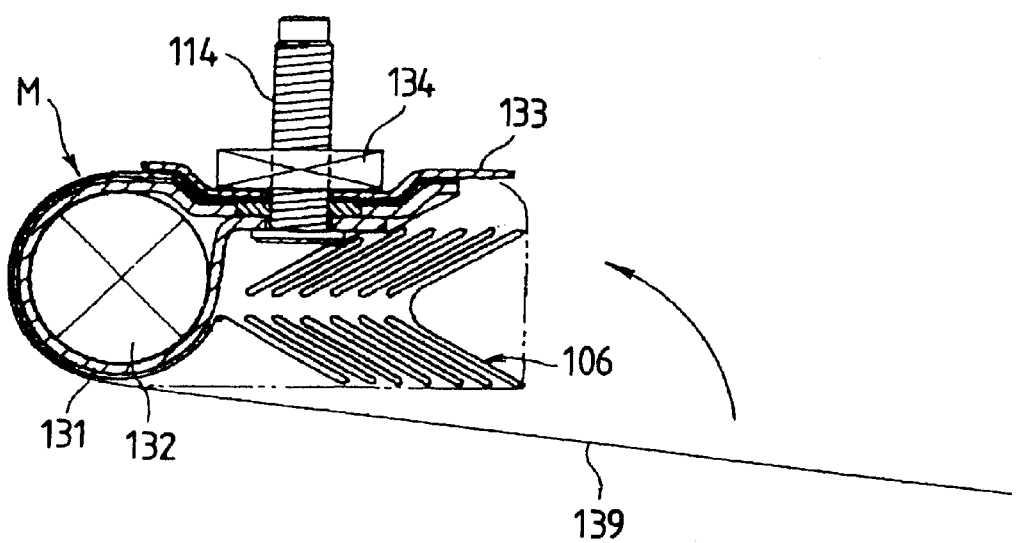
FIG. 19 is a plan view of the inflated air bag.

Further, as shown in FIG. 19, opposite ends of a protective cover 139, which is made from a piece of cloth to cover the folded air bag 106, are fixed while being sandwiched between the body portion 131A of the holder 131 and the side plate 133. The air bag 106 which has been already folded, is packed in the protective cover 139 compactly so as not to come apart from the inflator 132, the holder 131 and the side cover 133. Incidentally, the protective cover 139 never disturbs inflating of the air bag 106 because the protective cover 139 is ruptured easily when the air bag 106 is inflated.

The operation of this embodiment having the aforementioned configuration will be described below.

When the inflator 132 generates a gas in a vehicle collision, the air bag 106 is inflated in the inside of the module casing 135. When an inflating pressure of the air bag 6 acts on the cover portion 135C of the module casing 135, the stoppage teeth 135D, 135D . . . are disengaged from the stoppage cavities 135E, 135E . . . . As a result, the cover portion 135C rotates around the hinge portion 135B (see the chain line in FIG. 14), so that the body portion 135A is opened. Further, when pressure for opening the cover portion 135C shown in FIG. 12 is transmitted to the third coating material 122 of the seat back 102, the seam portion 125 is ruptured so that the second coating material 121 and the third coating material 122 are separated from each other. As a result, the air bag 106, passed through a gap between the second coating material 121 and the third coating material 122, is inflated obliquely forward in a plan view so as to be along both the center pillar 104 and the front door 105 as shown in FIG. 11.

Incidentally, when the air bag 106 begins to be inflated, the air bag 106 is inflated not just forward but laterally outward (in the inflating direction shown in FIG. 14), that is, obliquely forward in a plan view toward the center pillar 104 and the front door 105. By inflating the air bag 106 in the aforementioned direction, both opening of the modular casing 135 and rupturing of the seam portion 125 can be performed accurately so that the air bag 106 is inflated correctly between the occupant and the combination of the center pillar 104 and the front door 105.

Therefore, as shown in FIG. 14, a portion of from the point c to the point b in the base portion 137A of the base cloth 137 on the laterally inner side of the air bag 106 is provided as a surplus portion b~c, so that the surplus portion b~c, is disposed so as to be along the right surface of the body portion 131A of the holder 131. Accordingly, when the air bag 106 is inflated, the surplus portion b~c of the base cloth 137 on the laterally inner side rotates counterclockwise around the point b. As a result, the air bag 106 can move rightward (laterally outward) freely. Accordingly, the air bag 106 can be inflated obliquely rightward smoothly without interference with the occupant's right side and right arm.

Figure 20A:
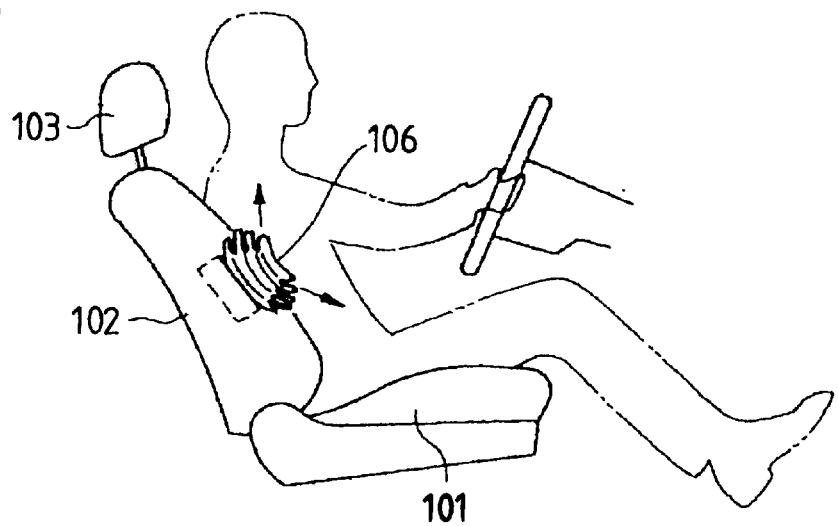
FIGS. 20A–20C are views showing the inflation of the air bag.

FIG. 20 is a view showing the inflation of the air bag 106. As shown in FIG. 14, the air bag 106 is folded so that a gas passage R is formed in the center. Accordingly, the gas generated by the inflator 132 directly strikes the seam portion 138 in the air bag 106. As a result, the air bag 106 begins to be inflated vertically and forward as shown in FIG. 20A.

Figure 20B:
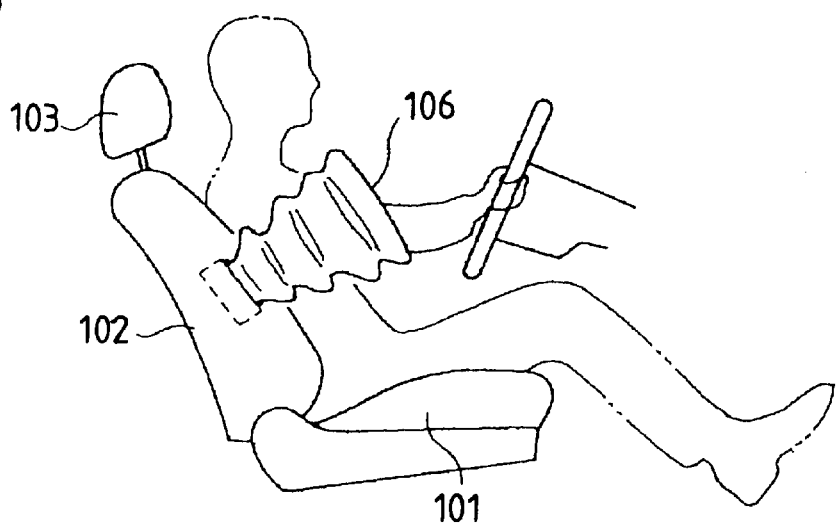
Figure 20C:
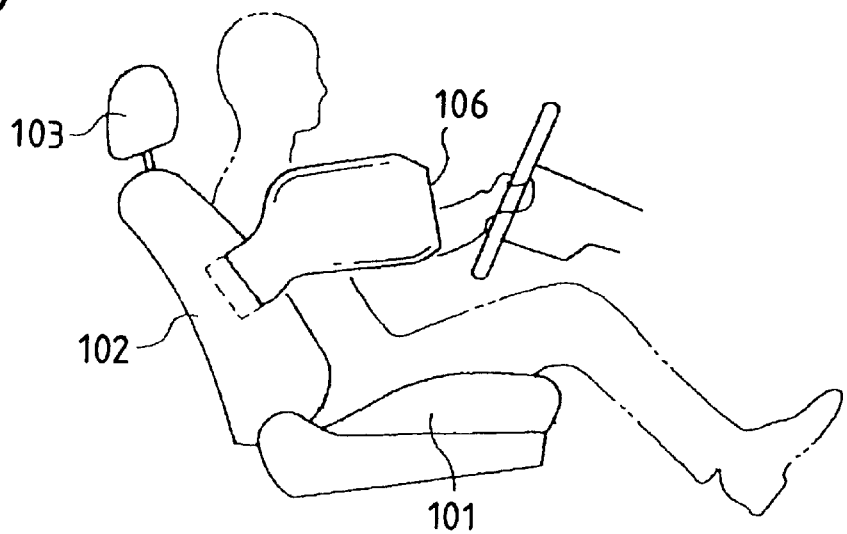

The air bag 106 is further inflated gradually intactly as shown in FIG. 20B. As a result, the air bag 106 is inflated perfectly as shown in FIG. 20C. The perfectly inflated air bag 6 can protect the occupant's chest, or the like, securely because it extends forward.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above, according to the present invention, inflating of an air bag can be performed quickly and securely, so that an occupant can be protected appropriately when a car is subjected to a side collision.

In addition, as described above, according to the present invention, a comparatively high position, such as the chest level, of an occupant can be protected securely, even in the case where a module is received in a low position of a side portion of a seat back so that occupant's comfort is not spoiled.

What is claimed is:

1. An air bag apparatus comprising:

an air bag folded into an angled bellow shape and disposed in a seat back, said air bag being adapted to be inflated with a gas generated by an inflator to thereby protect an occupant, said folded air bag having outer portions which extend further away from the inflator than a middle portion thereof, and said air bag includes a pair of base cloth portions which superimpose each other so as to be formed into a bag shape, said pair of base cloth portions being formed so that, when said air bag is to be folded into an angled bellow shape, said pair of base cloth portions are folded individually in the form of angled bellows while forming a gas flow passage between said pair of base cloth portions.

2. An air bag apparatus comprising:

an air bag disposed in a side portion of a seat back in a condition that said air bag is attached to a module and folded into an angled bellow shape, said air bag being adapted to be inflated with a gas generated by an inflator so as to be inflated between an occupant and an inner surface of a side portion of a vehicle body in case of a vehicle collision, said folded air bag having outer portions which extend further away from the inflator than a middle portion thereof, said air bag includes a base end portion and a protective portion which are designed so that said base end portion is adapted to be inflated to an upward direction directly more upward than a direction perpendicular to a longitudinal direction of said module so as to protect the chest of the occupant with said protective portion which is adapted to be inflated forward.

3. The air bag apparatus according to claim 2, wherein said air bag comprises:

a base end side located and extending along a longitudinal direction of said module;

curved sides extend from end portions, respectively, of a linear base end side so as to be curved upward;

forward extended sides extending substantially horizontally from the curved sides respectively;

bent sides extended from the forward extended sides respectively a vertical side connecting said bent sides;

wherein said base end portion is constituted by a portion surrounded by said base end side and said curved sides whereas said protective portion is constituted by a portion surrounded by said forward extended sides, said bent sides and said vertical side.

4. A side impact air bag apparatus located in a seat back of a vehicle for directly inflating an air bag longitudinally before completely inflating the bag in the width direction comprising:

a casing having an interior formed by a rear side wall and three additional side walls, a cover hingedly mounted to the casing approximate the rear side wall and a rear side opposite the cover for mounting the casing;

a side plate attached inside the casing to the rear side of the casing;

a holder attached to the side plate approximate the rear side wall for supporting an inflator;

the inflator being substantially cylindrical and having a front surface facing a bag and a rear surface facing the rear side wall, the inflator containing propellant and supported by the holder; and the bag enclosing the inflator and capable of direct inflation longitudinally before completely inflating in the width direction, the bag arranged inside the casing to have, a forward middle portion associated with the inflator, a right base cloth portion extending from the right of the forward middle portion and having first angled bellow folds of cloth and a right base end extending from the first angled bellow folds of cloth opposite the forward middle portion, the right base end extending around the holder approximate the rear surface of the inflator and attached between the holder and the side plate, a left base cloth portion extending from the left of the forward middle portion and having second angled bellow folds of cloth and a left base end extending from the second angled bellow folds of cloth opposite the forward middle portion, the left base end extending in a first direction opposite the rear side wall of the casing thereby creating a surplus portion and then extending between the holder and the side plate in a second direction toward the rear side wall and attached between the holder and the side plate, and an interior gas flow passage extending between the forward middle portion and the inflator and formed by a forward middle portion at the top of the gas flow passage, a right base cloth portion on the right of the gas flow passage and a left base cloth portion on the left of the gas flow passage, wherein gas generated by the inflator easily reaches the forward middle portion through the interior gas flow passage and pushes the forward middle portion out in a longitudinal direction before the first bellow folds and the second bellow folds are inflated.

5. The air bag apparatus of claim 4, wherein the first angled bellow folds of cloth and the second angled bellow folds of cloth are angled so the individual bellows approximate the cover and the rear side respectively are directed away from the inflator.

6. The air bag apparatus of claim 4, wherein the casing is formed of synthetic resin.

7. The air bag apparatus of claim 4, wherein the holder is formed of metal.

8. The air bag apparatus of claim 4, wherein the bag is formed by folding a piece of cloth in a middle and sewing edges of the piece of cloth together.

9. The air bag apparatus of claim 4 having a protective cover around the bag.

10. A side impact air bag apparatus located in a seat back of a vehicle for directly inflating an air bag longitudinally and vertically before completely inflating the bag in the width direction comprising:

a casing having an interior formed by a rear side wall and three additional side walls, a cover hingedly mounted to the casing approximate the rear side wall and a rear side opposite the cover for mounting the casing;

a side plate attached inside the casing to the rear side of the casing.

11. The air bag apparatus of claim 10, wherein the first angled bellow folds of cloth and the second angled bellow folds of cloth are angled so the individual bellows approximate the cover and the rear side respectively are directed away from the inflator.

12. The air bag apparatus of claim 10, wherein the casing is formed of synthetic resin.

13. The air bag apparatus of claim 10, wherein the holder is formed of metal.

14. The air bag apparatus of claim 10, wherein the bag is formed by folding a piece of cloth in a middle and sewing edges of the piece of cloth together.

15. The air bag apparatus of claim 10 having a protective cover around the bag.

16. The air bag apparatus of claim 10 wherein the bag has:
- a base end side extending along the longitudinal direction of the casing;
- curved sides extending from opposite sides of the base end portion and curved in a vertical direction;
- forward extending sides extending substantially horizontally from each of the curved sides;
- bent sides extending from each of the opposite ends of the forward extending sides;
- a vertical side connecting the bent sides; and
- two protective portions formed from each of the forward extending sides, the bent sides, the vertical side, and the base end side;
- a holder attached to the side plate approximate the rear side wall for supporting an inflator;
- the inflator being substantially cylindrical and having a front surface facing a bag and a rear surface facing the rear side wall, the inflator containing propellant and supported by the holder; and
- the bag enclosing the inflator and capable of direct inflation longitudinally before completely inflating in the width direction, the bag being shaped to extend in three directions, vertically, longitudinally and in the width direction, with the longitudinal sides of the bag longer than the vertical sides of the bag, and the bag arranged inside the casing to have,
- a forward middle portion associated with the inflator,
- a right base cloth portion extending from the right of the forward middle portion and having first angled bellow folds of cloth and a right base end extending from the first angled bellow folds of cloth opposite the forward middle portion, the right base end extending around the holder approximate the rear surface of the inflator and attached between the holder and the side plate,
- a left base cloth portion extending from the left of the forward middle portion and having second angled bellow folds of cloth and a left base end extending from the second angled bellow folds of cloth opposite the forward middle portion, the left base end extending in a first direction opposite the rear side wall of the casing thereby creating a surplus portion and then extending between the holder and the side plate in a second direction toward the rear side wall and attached between the holder and the side plate, and
- an interior gas flow passage extending between the forward middle portion and the inflator and formed by a forward middle portion at the top of the gas flow passage, a right base cloth portion on the right of the gas flow passage and a left base cloth portion on the left of the gas flow passage, wherein gas generated by the inflator easily reaches the forward middle portion through the interior gas flow passage and pushes the forward middle portion out in a longitudinal direction and a vertical direction before the first bellow folds and the second bellow folds are inflated.

* * * * *